(12) United States Patent
Saito et al.

(10) Patent No.: US 7,520,142 B2
(45) Date of Patent: Apr. 21, 2009

(54) EJECTOR TYPE REFRIGERATING CYCLE

(75) Inventors: Mika Saito, Kariya (JP); Hirotsugu Takeuchi, Nagoya (JP); Yoshiaki Takano, Kosai (JP); Hiroshi Oshitani, Toyota (JP); Naohisa Ishizaka, Okazaki (JP); Gota Ogata, Obu (JP); Takuo Maehara, Toyohashi (JP)

(73) Assignee: Denso Corporation, Kariya (JP)

( * ) Notice: Subject to any disclaimer, the term of this patent is extended or adjusted under 35 U.S.C. 154(b) by 180 days.

(21) Appl. No.: 11/393,037

(22) Filed: Mar. 30, 2006

(65) Prior Publication Data
US 2006/0218964 A1 Oct. 5, 2006

(30) Foreign Application Priority Data

| Apr. 1, 2005 | (JP) | 2005-105992 |
| Jul. 4, 2005 | (JP) | 2005-195105 |
| Feb. 14, 2006 | (JP) | 2006-036532 |

(51) Int. Cl.
*F25B 1/06* (2006.01)
(52) U.S. Cl. ......................................... 62/500; 62/512
(58) Field of Classification Search .................. 62/170, 62/174, 191, 278, 500, 503, 512; 417/76, 417/87, 151
See application file for complete search history.

(56) References Cited

U.S. PATENT DOCUMENTS

| 6,477,857 B2 | 11/2002 | Takeuchi et al. |
| 6,574,987 B2 | 6/2003 | Takeuchi et al. |
| 6,729,149 B2 * | 5/2004 | Takeuchi ............ 62/191 |
| 6,799,435 B2 * | 10/2004 | Saito et al. ............ 62/500 |
| 6,834,514 B2 * | 12/2004 | Takeuchi et al. ....... 62/500 |
| 6,866,090 B2 | 3/2005 | Takamatsu et al. |
| 6,923,019 B2 * | 8/2005 | Kawakubo et al. ...... 62/506 |

(Continued)

FOREIGN PATENT DOCUMENTS

JP  03-005674  1/1991

(Continued)

OTHER PUBLICATIONS

Office Action from corresponding Chinese Patent Application No. 200610071052.3 dated Dec. 28, 2007 with English translation.

(Continued)

*Primary Examiner*—Mohammad M Ali
(74) *Attorney, Agent, or Firm*—Harness, Dickey & Pierce, PLC

(57) ABSTRACT

An ejector type refrigerating cycle comprises a compressor, a heat radiating device, an ejector, and a first vaporizing device, which are connected in a circuit to form a refrigerating cycle. A bypass passage is provided between an inlet port and a suction port of the ejector, so that a part of the refrigerant is bifurcated to flow through the bypass passage. A second vaporizing device is provided in the bypass passage. An internal heat exchanger is further provided between an outlet side of the heat radiating device and the inlet side of the ejector, so that the enthalpy of the high-pressure refrigerant from the heat radiating device is reduced, to thereby increase an enthalpy difference between the inlet side and outlet side of the first and second vaporizing devices. As a result, the cooling capability by the both vaporizing devices can be improved.

28 Claims, 12 Drawing Sheets

U.S. PATENT DOCUMENTS

| | | |
|---|---|---|
| 7,299,645 B2 * | 11/2007 | Oshitani et al. ............... 62/191 |
| 2003/0010488 A1 | 1/2003 | Watanabe et al. |
| 2003/0066301 A1 * | 4/2003 | Takeuchi ..................... 62/191 |
| 2003/0200764 A1 * | 10/2003 | Takeuchi et al. .............. 62/500 |
| 2004/0031596 A1 * | 2/2004 | Nishida et al. .............. 165/140 |
| 2004/0079102 A1 * | 4/2004 | Umebayashi et al. ...... 62/324.1 |
| 2004/0169369 A1 | 9/2004 | Takamatsu et al. |
| 2005/0178150 A1 | 8/2005 | Oshitani et al. |
| 2005/0268644 A1 | 12/2005 | Oshitani et al. |
| 2006/0005941 A1 | 1/2006 | Watanabe et al. |

FOREIGN PATENT DOCUMENTS

| | | |
|---|---|---|
| JP | 05-312421 | 11/1993 |
| JP | 2002-340485 | 11/2002 |
| JP | 2002-349977 A * | 12/2002 |

OTHER PUBLICATIONS

Office Action dated Sep. 19, 2008 in Chinese Application No. 2006 1007 1052.3 with English translation.

* cited by examiner

US 7,520,142 B2

EJECTOR TYPE REFRIGERATING CYCLE

CROSS REFERENCE TO RELATED APPLICATION

This application is based on Japanese Patent Applications Nos. 2005-105992 filed on Apr. 1, 2005, 2005-195105 filed on Jul. 4, 2005 and 2006-36532 filed on Feb. 14, 2006, the disclosures of which are incorporated herein by reference.

FIELD OF THE INVENTION

The present invention relates to an ejector type refrigerating cycle having an ejector for depressurizing and circulating refrigerant, multiple vaporizing devices, and an internal heat exchanger. The present invention is preferably applied to a refrigerating cycle for an air conditioning apparatus and a refrigerating apparatus.

BACKGROUND OF THE INVENTION

An ejector type refrigerating cycle is proposed, for example as disclosed in Japanese Patent No. 3322263, in which an ejector is used as a means for depressurizing and circulating refrigerant in the refrigerating cycle of a gas compression type.

According to the above prior art (JP Pat. No. 3322263), as shown in FIG. 20, a first vaporizing device 61 is arranged between a refrigerant outlet side of an ejector 14 and a gas-liquid separator 63, and a second vaporizing device 62 is arranged between a refrigerant outlet side of the gas-liquid separator 63 and a refrigerant suction port 14b of the ejector 14.

In the above ejector type refrigerating cycle, a gas phase refrigerant discharged from the second vaporizing device 62 is sucked into the ejector 14 by pressure decrease caused by jet flow at expansion of the refrigerant, and speed energy is converted into pressure energy by a defusing portion (a pressure increasing portion) 14d to increase the refrigerant pressure. As a result, a driving force of a compressor 11 can be reduced, to improve operational efficiency of the cycle.

Heat absorbing operation (cooling operation) can be carried out by the two vaporizing devices 61 and 62 for independent two spaces or one common space.

It is further disclosed in the above prior art that, according to the ejector type refrigerating cycle, only one vaporizing device 62 is arranged between the refrigerant outlet side of the gas-liquid separator 63 and the refrigerant suction port 14b of the ejector 14, and an internal heat exchanger is provided to perform heat exchange between the gas phase low-pressure refrigerant flowing out from the gas-liquid separator 63 and the high-pressure refrigerant at an outlet side of a heat radiating device 13.

It is, however, a problem in the ejector type refrigerating cycle of the above prior art that flow amounts of the refrigerant to the respective (first and second) vaporizing devices 61 and 62 are not easily adjusted, because the respective flow amounts of the refrigerant to the first and second vaporizing devices 61 and 62 must be adjusted by the one ejector 14, whereas the operation (function) of the ejector 14 for circulating the refrigerant (suck-in operation of the gas phase refrigerant) is performed at the same time.

Furthermore, in a low load operation, in which a thermal load for the cycle is small, pressure difference between high-pressure side and low pressure side of the refrigerant in the cycle becomes smaller, and input energy of the refrigerant to the ejector is correspondingly small. As a consequence, the refrigerant suck-in performance is decreased at the ejector 14, the flow amount of the refrigerant passing through the second vaporizing device 62 is thereby decreased. This results in another problem that the performance for the cooling operation at the second vaporizing device 62 is decreased.

This problem also occurs in the ejector type refrigerating cycle having the internal heat exchanger, which is disclosed in the drawings 34 to 38 of the above prior art (JP Pat. No. 3322263).

SUMMARY OF THE INVENTION

The present invention is made in view of the foregoing problems, and has an object to provide an ejector type refrigerating cycle having multiple vaporizing devices, according to which flow amounts of the refrigerant to the respective vaporizing devices can be easily adjusted.

It is another object of the present invention to provide an ejector type refrigerating cycle, in which high performance of the cooling operation at a second vaporizing device, which is connected to a refrigerant suction port of an ejector, can be realized.

It is a further object of the present invention to provide an ejector type refrigerating cycle having an internal heat exchanger, in which performance of the cooling operation can be improved.

According to a feature of the present invention, an ejector type refrigerating cycle comprises a compressor (11) for sucking refrigerant and compressing the same, and a heat radiating device (13, 13b, 13c) for radiating heat from high-pressure refrigerant pumped out from the compressor (11).

An ejector (14) is provided in the refrigerating cycle, which has a nozzle portion (14a) for depressurizing and expanding the refrigerant from the heat radiating device (13, 13b, 13c), a suction port (14b) for sucking the refrigerant by high speed refrigerant flow ejected from the nozzle portion (14a), and a pressure increasing portion (14d) for mixing the high speed refrigerant ejected from the ejector nozzle (14a) with the refrigerant sucked from the suction port (14b) and for increasing fluid pressure of the refrigerant while converting the speed energy of the refrigerant to pressure energy.

The refrigerating cycle further comprises a first vaporizing device (15) for evaporating the refrigerant from the ejector (14) to perform a cooling operation, a first bypass passage (16) bifurcated at an inlet side (Z) of the ejector (14) for supplying a part of the refrigerant from the heat radiating device (13, 13b, 13c) to the suction port (14b) of the ejector (14), a first restricting device (17) provided in the first bypass passage (16) for depressurizing the part of the refrigerant from the heat radiating device (13, 13b, 13c), a second vaporizing device (18) provided in the first bypass passage (16) at an outlet side of the first restricting device (17) for evaporating the refrigerant to perform a cooling operation, and an internal heat exchanger (21, 211, 212) for carrying out heat exchange between low-pressure refrigerant on an inlet side of the compressor (11) and high-pressure refrigerant on an outlet side of the compressor (11).

According to the above feature, the refrigerant can be introduced into both of the first and second vaporizing devices (15, 18) at the same time, in the above ejector type refrigerating cycle in which an operation of high efficiency is achieved by reducing driving force for the compressor. Heat absorbing operation can be simultaneously performed in an intended space (or spaces) for cooling operation by the first and second vaporizing devices (15, 18).

Furthermore, the refrigerant flow amount for the first vaporizing device (15) can be controlled by a restriction characteristic of the ejector (14). The refrigerant flow amount to the second vaporizing device (18) can be independently adjusted by the first restricting device (17) provided in the first bypass passage (16). Accordingly, the respective refrigerant flow amounts for the first and second vaporizing devices (15, 18) can be independently adjusted in accordance with thermal loads for the vaporizing devices.

Since the first bypass passage (16) supplies the refrigerant bifurcated at the inlet side (Z) of the ejector (14) to the suction port (14b) thereof, the refrigerant is introduced into the ejector (14) by use of not only the suck-in operation of the ejector but also the compression operation of the compressor (11) (the suction and discharge operation by the compressor). Accordingly, even in a low load operation of the refrigerating cycle (i.e. when input energy of the refrigerant to the ejector is reduced, as a result pressure difference in the cycle becomes smaller), necessary refrigerant flow amount to the second vaporizing device (18) in the first bypass passage (16) can be assured to achieve necessary cooling capability performed by the second vaporizing device (18).

Furthermore, since the internal heat exchanger (21, 211, 212) is provided for the heat exchange between the low-pressure refrigerant in the inlet side of the compressor (11) and the high-pressure refrigerant in the outlet side of the compressor (11), the enthalpy of the high-pressure refrigerant at the outlet side of the heat radiating device (13, 13b, 13c), namely the enthalpy of the refrigerant at the inlet side of the vaporizing devices can be reduced to thereby increase an enthalpy difference between the inlet side and the outlet side of the vaporizing devices. The cooling capability at the first and second vaporizing devices (15, 18) can be further improved.

The high-pressure refrigerant in the outlet side of the compressor (11) is meant to include the refrigerant in the refrigerant passage from the outlet side of the compressor (11) to the outlet side of the heat radiating device (13, 13b, 13c).

According to another feature of the present invention, an ejector type refrigerating cycle comprises a compressor (11) for sucking refrigerant and compressing the same, and a heat radiating device (13) for radiating heat from high-pressure refrigerant pumped out from the compressor (11). An expansion valve (30) is provided in a refrigerant passage (31) on an outlet side of the heat radiating device (13) for controlling condition of low-pressure refrigerant at the inlet side of the compressor (11) by adjusting a passage opening area of the refrigerant passage (31).

An ejector (14) is also provided in the refrigerating, wherein the ejector (14) comprises a nozzle portion (14a) for depressurizing and expanding the refrigerant from the expansion valve (30), a suction port (14b) for sucking the refrigerant by high speed refrigerant flow ejected from the nozzle portion (14a), and a pressure increasing portion (14d) for mixing the high speed refrigerant ejected from the ejector nozzle (14a) with the refrigerant sucked from the suction port (14b) and for increasing fluid pressure of the refrigerant while converting the speed energy of the refrigerant to pressure energy.

The refrigerating cycle further comprises a first vaporizing device (15) for evaporating the refrigerant from the ejector (14) to perform a cooling operation, a bypass passage (16) bifurcated at an inlet side (Z) of the ejector (14) for supplying a part of the refrigerant from the expansion valve (30) to the suction port (14b) of the ejector (14), a restricting device (17) provided in the bypass passage (16) for depressurizing the part of the refrigerant from the expansion valve (30), a second vaporizing device (18) provided in the bypass passage (16) at an outlet side of the restricting device (17) for evaporating the refrigerant to perform a cooling operation, and an internal heat exchanger (21) for carrying out heat exchange between low-pressure refrigerant on the inlet side of the compressor (11) and high-pressure refrigerant on an inlet side of the expansion valve (30), or between the low-pressure refrigerant on the inlet side of the compressor (11) and intermediate-pressure refrigerant on an outlet side of the expansion valve (30).

According to the above feature, the second vaporizing device (18) provided in the suction port side of the ejector (14) is arranged in the bypass passage (16) bifurcated from the inlet side of the ejector (14), and the high-pressure refrigerant at the inlet side of the expansion valve (30) or the intermediate pressure refrigerant at the outlet side of the expansion valve (30) is cooled down in the internal heat exchanger (21). The enthalpy of the refrigerant is thereby reduced, so that the cooling capability at the first and second vaporizing devices (15, 18) can be likewise improved.

In addition, the condition of the low-pressure refrigerant at the inlet side of the compressor (11) is controlled by adjusting, by the expansion valve (30), the passage opening area of the refrigerant passage (31) at the outlet side of the heat radiating device (13, 13b, 13c), and the intermediate-pressure refrigerant from the expansion valve (30) is bifurcated to the inlet side of the ejector (14) and to the bypass passage (16). As a result, the refrigerant flow amount can be appropriately controlled by the expansion valve (30), so that the condition of the low-pressure refrigerant at the inlet side of the compressor (11) is maintained at a predetermined condition (e.g. the predetermined super heated condition), and furthermore the refrigerant flow amount distributed to the first and second vaporizing devices (15, 18) can be properly controlled. The cooling capability at both of the first and second vaporizing devices (15, 18) can be further improved by such proper distribution of the refrigerant.

According to a further feature of the present invention, an ejector type refrigerating cycle has first and second refrigerating cycles.

The first refrigerating circuit includes; a compressor (11) for compressing gas phase refrigerant and pumping out compressed high-pressure refrigerant; a heat radiating device (13) connected to an outlet side of the compressor (11) for cooling down the high-pressure refrigerant; an ejector (14) having an inlet port, an outlet port (14d) and a suction port (14b), in which the inlet port of the ejector (14) is connected to an outlet side of the heat radiating device (13), the ejector (14) further having a nozzle portion (14a) for depressurizing and expanding the refrigerant from the heat radiating device (13), wherein the outlet port (14d) mixes the high speed refrigerant ejected from the nozzle portion (14a) with the refrigerant sucked from the suction port (14b) and increases fluid pressure of the refrigerant while converting the speed energy of the refrigerant to the pressure energy; and a first vaporizing device (15) connected at its inlet side to the outlet port (14d) of the ejector (14), and at its outlet side to the inlet side of the compressor (11).

The second refrigerating circuit includes; the compressor (11); the heat radiating device (13); a bypass passage (16) bifurcated from the inlet side of the ejector (14) and connected to the suction port (14b) of the ejector (14); a second vaporizing device (18) provided in the bypass passage (16); and the first vaporizing device (15).

The ejector type refrigerating cycle further comprises an internal heat exchanger (21, 211, 212) having high-pressure side and low-pressure side refrigerant passages (21a, 211a, 212a, 21b, 211b, 212b), wherein the high-pressure side refrigerant passage (21a, 211a, 212a) is provided between the outlet side of the heat radiating device (13) and the inlet port of the ejector (14), and/or between the outlet side of the heat radiating device (13) and the inlet side of the second vaporizing device (18), whereas the low-pressure side refrigerant passage (21b, 211b, 212b) is provided between the outlet side of the first vaporizing device (15) and the inlet side of the compressor (11).

BRIEF DESCRIPTION OF THE DRAWINGS

The above and other objects, features and advantages of the present invention will become more apparent from the following detailed description made with reference to the accompanying drawing. In the drawing.

DETAILED DESCRIPTION OF THE PREFERRED EMBODIMENTS

First Embodiment

Figure 1:
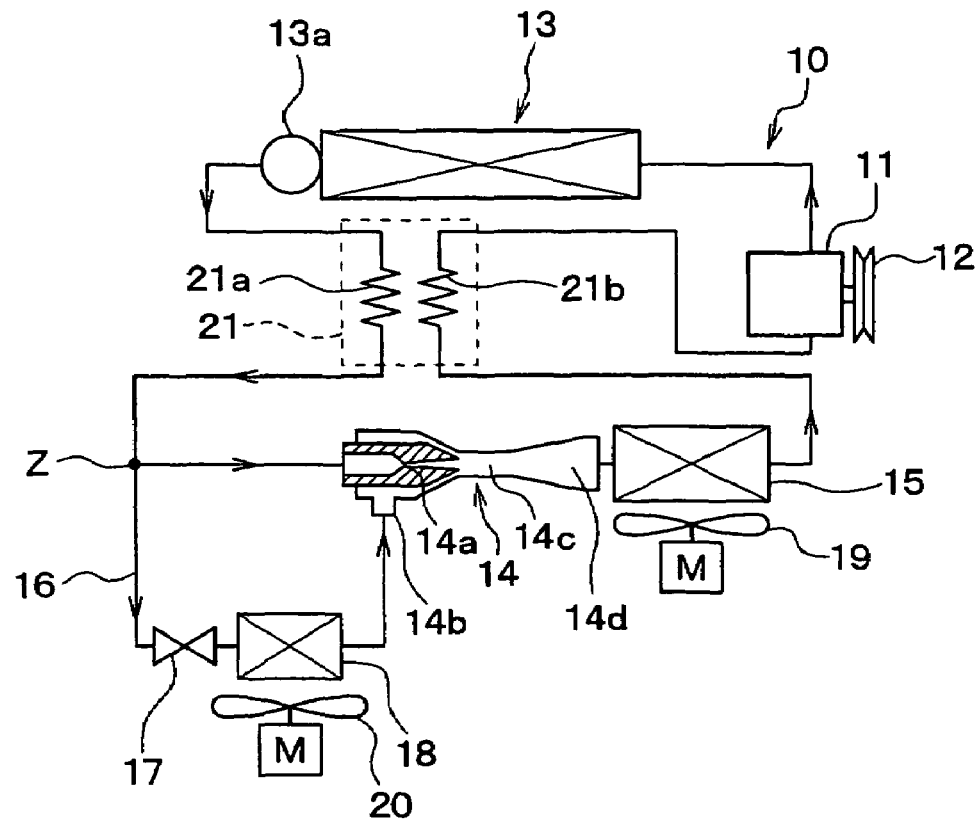
FIG. 1 is a schematic refrigerant circuit diagram of an ejector type refrigerating cycle according to a first embodiment of the present invention.

FIG. 1 shows an ejector type refrigerating cycle according to a first embodiment of the present invention, which is applied to a refrigerating cycle for an automotive vehicle. In the refrigerating cycle 10 according to this embodiment, a compressor 11 for sucking in and compressing refrigerant is driven by an engine for the automotive vehicle (not shown) via an electromagnetic clutch 12, a belt and so on.

Any type of compressor can be used as the compressor 11, for example, a capacitor variable type compressor which can adjust refrigerant discharge performance depending on variation of the discharge amount, or a fixed capacitor type compressor which can adjust refrigerant discharge performance by changing an operating rate thereof with ON-OFF of the electromagnetic clutch 12. In the case that an electrically operated compressor is used, the refrigerant discharge performance can be adjusted by controlling rotational speed of an electric motor.

A heat radiating device (condenser) 13 is connected to a discharge side (outlet side) of the compressor 11. The heat radiating device 13 carries out heat exchange between high-pressure refrigerant discharged from the compressor 11 and outside air (the air outside the vehicle) brown by a cooling fan (not shown), to cool down the high-pressure refrigerant.

Fluorocarbon gas, hydrocarbon gas and the like, high pressure of which does not exceed its critical pressure, is used as the refrigerant for the refrigerating cycle 10, wherein a sub-critical cycle of gas compression type is formed. The heat radiating device 13 is, therefore, operated as a condenser for condensing the refrigerant.

A receiver 13a is provided at an outlet side of the heat radiating device 13. The receiver 13a is a tank of an elongated shape to form a gas-liquid separator, so that the refrigerant is separated into gas phase and liquid phase refrigerant and the surplus liquid phase refrigerant is stored in the tank. The liquid phase refrigerant is taken out from a bottom portion of the receiver 13a and discharged from the outlet side thereof. The receiver 13a is integrally formed with the heat radiating device 13.

Another well known heat exchanger can be used as the heat radiating device 13. Namely, a heat exchanger for condensing the refrigerant can be provided at an upstream side of the refrigerant flow, and the receiver 13a is provided for receiving the refrigerant from this heat exchanger and separating the refrigerant into the gas phase and the liquid phase refrigerant. And the heat exchanger may have a super cool heat changing portion, in which saturated liquid phase refrigerant from the receiver 13a is super cooled.

A high-pressure side refrigerant passage 21a of an internal heat exchanger 21 is provided at the outlet side of the receiver 13a. The internal heat exchanger 21 carries out heat exchange between the high-temperature and high-pressure refrigerant in the high-pressure side refrigerant passage 21a and the low-temperature and low-pressure refrigerant in a low-pressure side refrigerant passage 21b. The low-pressure side refrigerant passage 21b is connected to a suction side (inlet side) of the compressor 11.

Figure 2:
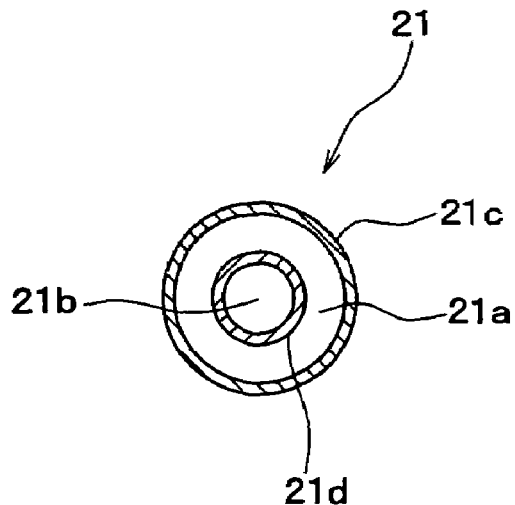
FIG. 2 is a schematic cross sectional view of an internal heat exchanger shown in FIG. 1.

Various kinds of structures can be used as a structure for the internal heat exchanger 21. According to the embodiment, a double pipe structure is used for the internal heat exchanger 21, as shown in FIG. 2. More specifically, it is constructed that an inside pipe 21d for the low-pressure side refrigerant passage 21b is formed at an inside of an outside pipe 21c for the high-pressure side refrigerant passage 21a.

An ejector 14 is arranged at an outlet side of the high-pressure side refrigerant passage 21a of the internal heat exchanger 21. The ejector 14 operates not only as a pressure decreasing means for decreasing the refrigerant pressure but also as a refrigerant circulating means (a pump means) for circulating the refrigerant by the suck-in operation of the refrigerant ejected at a high speed.

The ejector 14 comprises a nozzle portion 14a, a passage area of which is restricted by a small opening, so that the high pressure refrigerant from the outlet side of the high-pressure side refrigerant passage 21a is depressurized and expanded in an isentropic manner. The ejector 14 further comprises a refrigerant suction port 14b, which is arranged in the same space to a refrigerant ejecting port of the nozzle portion 14a, for sucking in the gas phase refrigerant from a second vaporizing device (evaporator) 18.

A mixing portion 14c is further provided at a downstream side of the refrigerant flow from the nozzle portion 14a and the suction port 14b, so that the high speed refrigerant ejected from the nozzle portion 14a is mixed with the refrigerant sucked from the suction port 14b. A defusing portion 14d is formed at a downstream side of the mixing portion 14c for increasing the refrigerant pressure. The defusing portion 14d has a configuration such that a passage area is gradually enlarged, in order to slow down the refrigerant flow and to thereby increase the refrigerant pressure. As a result, the speed energy of the refrigerant is converted into the pressure energy. A first vaporizing device (evaporator) 15 is connected to an outlet side (outlet port) of the defusing portion 14d of the ejector 14.

A refrigerant bypass passage 16 is bifurcated from a bifurcating point Z (between the heat radiating device 13 and an inlet port of the ejector 14), and its downstream end is connected to the suction port 14b of the ejector 14.

A restricting device (e.g. a fixed orifice) 17 is provided in the bypass passage 16 and the second vaporizing device 18 is arranged at a downstream side of the restricting device 17. The restricting device 17 is formed by a fixed restriction valve, such as a capillary tube, or an orifice, and operates as a depressurizing means for adjusting the refrigerant flow amount to the second vaporizing device 18. An electrically driven valve device can be used for the restriction device 17, so that a valve opening degree (a passage opening area) can be adjusted by an electromagnetic actuator.

In the above first embodiment, a first refrigerating circuit is formed by the compressor 11, the heat radiating device 13, the high-pressure side refrigerant passage 21a of the internal heat exchanger 21, the ejector 14 (the inlet and outlet ports), the first vaporizing device 15, and the low-pressure side refrigerant passage 21b of the internal heat exchanger 21, whereas a second refrigerating circuit is formed by the compressor 11, the heat radiating device 13, the high-pressure side refrigerant passage 21a, the bypass passage 16, the second vaporizing device 18, the ejector 14 (the suction and outlet ports), the first vaporizing device 15, and the low-pressure side refrigerant passage 21b.

According to the embodiment, the first vaporizing device 15 is used as an evaporator for performing an air-conditioning operation for an automotive passenger room, wherein air blown by an electrical air blowing device 19 is cooled down by the first vaporizing device 15 and the cooled air is blown into the automotive passenger room.

The second vaporizing device 18, according to the embodiment, is used for cooling an automotive refrigerating apparatus, wherein the air of the refrigerating apparatus blown by an electrical air blowing device 20 is cooled down by the second vaporizing device 18 and the cooled air is blown (circulated) into the refrigerating apparatus to cool the inside thereof.

An operation of the first embodiment will be explained. When the compressor 11 is driven by the automotive engine, the gas phase high-temperature and high-pressure refrigerant discharged from the compressor 11 flows into the heat radiating device 13, at which the gas phase refrigerant of the high-temperature and high-pressure is cooled down by the air and condensed. The condensed high-pressure refrigerant from the heat radiating device 13 flows into the receiver 13a, so that the refrigerant is separated into the gas phase and liquid phase refrigerant.

The liquid phase refrigerant flows out from the receiver 13a and flows into the high-pressure side refrigerant passage 21a of the internal heat exchanger 21. The heat exchange is carried out in the internal heat exchanger, between the high-temperature and high-pressure refrigerant in the high-pressure side refrigerant passage 21a and the low-temperature and low-pressure refrigerant in the low-pressure side refrigerant passage 21b, so that the high-pressure refrigerant is further cooled down, to increase the super cool degree.

The super cooled high-pressure refrigerant is bifurcated at the bifurcating point Z, being separated into the refrigerant flow to the ejector 14 and the refrigerant flow to the bypass passage 16.

The refrigerant flowing into the ejector 14 is depressurized and expanded at the nozzle portion 14a, so that the pressure energy is converted into the speed energy at the nozzle portion 14a and the refrigerant is ejected at high speed from the ejecting port. The gas phase refrigerant is sucked in from the suction port 14b by the suck-in operation at the ejector 14, wherein the refrigerant flows through the bypass passage 16 and the second vaporizing device 18.

The refrigerant ejected from the nozzle portion 14a and the refrigerant sucked from the suction port 14b are mixed with each other at the mixing portion 14c, which is located at the downstream side of the nozzle portion 14a. The mixed refrigerant then flows into the defusing portion 14d, in which the speed (expansion) energy is converted into the pressure energy due to the gradual increase of the passage area, and the refrigerant pressure is increased.

The refrigerant flows out from the defusing portion 14d of the ejector 14 and flows into the first vaporizing device 15, in which the low-pressure refrigerant will be evaporated by absorbing the heat from the air blown by the electrical air blowing device 19. The refrigerant from the first vaporizing device 15 flows into the low-pressure side refrigerant passage 21b of the internal heat exchanger 21, and the heat exchange is carried out with the high-pressure refrigerant in the high-pressure side refrigerant passage 21a. The gas phase refrigerant from the low-pressure side refrigerant passage 21b is sucked into and compressed again by the compressor 11.

The refrigerant flowing into the bypass passage 16 is depressurized by the restricting device 17, so that the refrigerant is changed to the low-pressure refrigerant. The low-pressure refrigerant flows into the second vaporizing device 18, in which the low-pressure refrigerant will be evaporated by absorbing the heat from the air blown by the electrical air blowing device 20. The gas phase refrigerant from the second vaporizing device 18 is sucked into the ejector 14 through the suction port 14b.

According to the embodiment, as described above, the refrigerant at the downstream side (the outlet port) of the defusing portion 14d of the ejector 14 is supplied to the first vaporizing device 15, and at the same time, the refrigerant in the bypass passage 16 is supplied to the second vaporizing device 18 through the restricting device 17, so that the cooling operations can be simultaneously carried out by the first and second vaporizing devices 15 and 18.

In the above operation, the refrigerant pressure of the evaporation in the first vaporizing device 15 corresponds to the refrigerant pressure increased at the defusing portion 14d, whereas the refrigerant pressure at the nozzle portion 14a (which is the lowest pressure, shortly after the depressurization) is applied to the second vaporizing device 18, because the outlet side of the second vaporizing device 18 is connected to the suction port 14b of the ejector 14.

As above, the refrigerant evaporation pressure (the refrigerant evaporation temperature) in the second vaporizing device 18 can be made lower than the refrigerant evaporation pressure (the refrigerant evaporation temperature) in the first vaporizing device 15. Since, according to the embodiment, the first vaporizing device 15 is used for the cooling operation of the passenger room, whereas the second vaporizing device 18 is used for the cooling operation of the refrigerating apparatus, the temperature in the refrigerating apparatus can be controlled at a lower value than that for the passenger room. In other words, the cooling operations for the passenger room and the refrigerating apparatus can be independently controlled at two different (higher and lower) temperatures.

Furthermore, the refrigerant flow amount to the second vaporizing device 18 can be independently controlled by the restricting device 17, without depending on the function of the ejector 14. The refrigerant flow amount to the first vaporizing device 15 can be also adjusted by the control of the refrigerant discharge performance of the compressor 11 and the restricting characteristic of the ejector 14. As a result, the refrigerant flow amounts to the respective first and second vaporizing devices 15 and 18 can be easily controlled depending on the respective thermal loads.

In the above operation, the refrigerant pressure is increased at the defusing portion 14d, and the compression work amount at the compressor 11 can be reduced by such an amount corresponding to the pressure increase of the refrigerant at the inlet side of the compressor 11. Accordingly, the driving force for the compressor 11 can be reduced.

Figure 20:
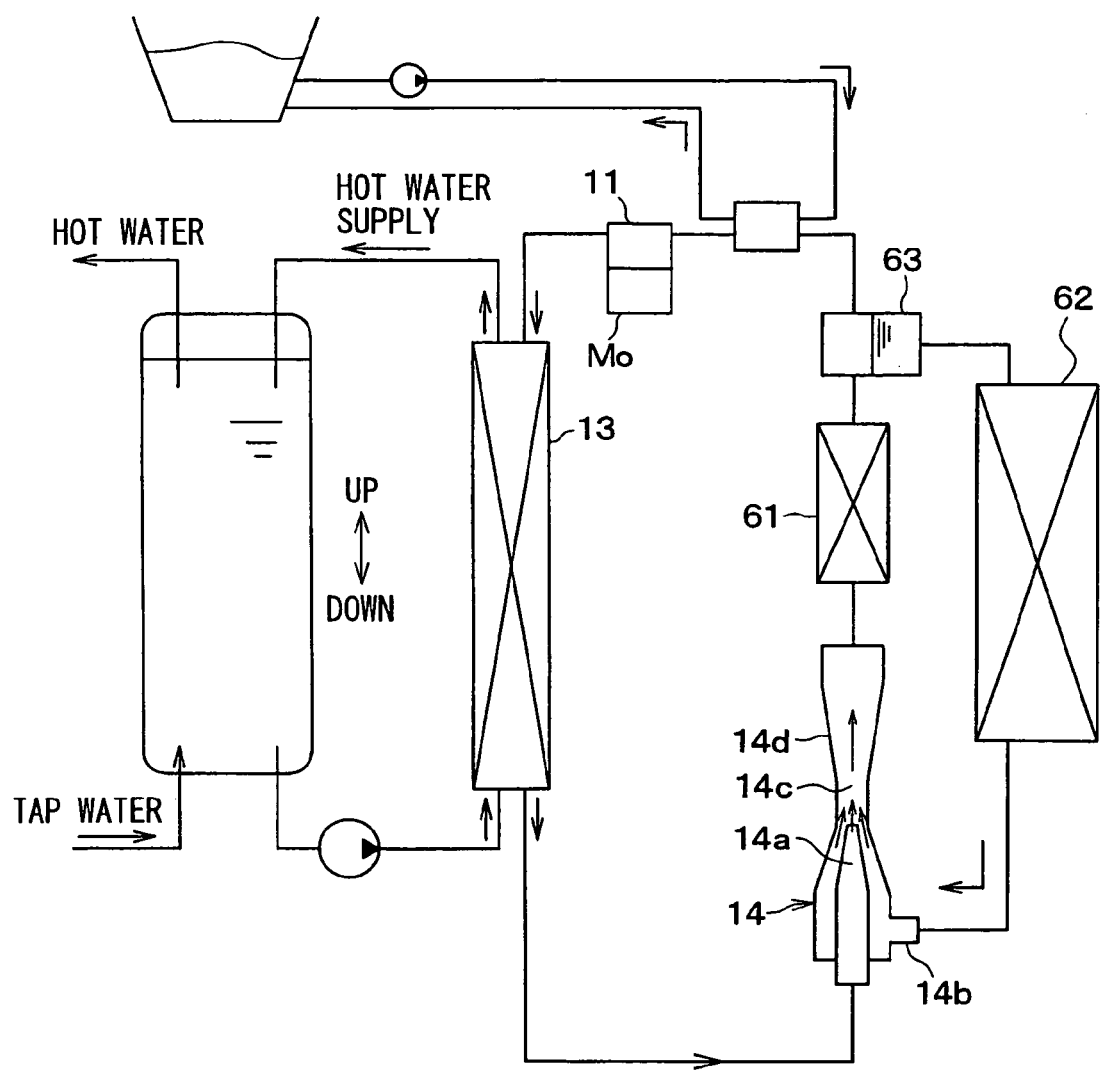
FIG. 20 is a schematic refrigerant circuit diagram of an ejector type refrigerating cycle according to a prior art.

In an operational condition, in which the thermal load is small in the cycle, the refrigerant pressure difference in the cycle becomes smaller, and the input energy of the refrigerant to the ejector 14 becomes correspondingly smaller. According to the refrigerating cycle of the above mentioned prior art (JP Pat. No. 3322263), as shown in FIG. 20 of this patent application, the refrigerant flow amount flowing through the evaporator 62 only depends on the suck-in operation of the refrigerant at the ejector 14. When the input energy of the refrigerant to the ejector 14 is reduced, the suck-in operation of the refrigerant at the ejector 14 is correspondingly reduced. Therefore, the refrigerant flow amount through the second evaporator 62 is decreased, and thereby necessary performance of the cooling operation can not be easily achieved.

According to the present invention, however, the high-pressure refrigerant is bifurcated at the upstream side (the bifurcating point Z) of the ejector 14, and the bifurcated refrigerant flows through the bypass passage 16 and sucked into the suction port 14b. Namely, the refrigerant bypass passage 16 is arranged in parallel to the ejector 14.

The refrigerant can be, therefore, supplied to the second vaporizing device 18 not only by the suck-in operation of the refrigerant at the ejector 14 from the bypass passage 16, but also by use of the performance of the refrigerant suction and refrigerant discharge of the compressor 11. Accordingly, even when the input energy of the refrigerant to the ejector 14 is reduced, and the suck-in operation of the refrigerant at the ejector 14 is thereby reduced, the decrease of the refrigerant flow to the second vaporizing device 18 can be suppressed to a smaller amount, in comparison with the case of the above mentioned prior art (JP Pat. No. 3322263). Even in the operational condition, in which the thermal load is small in the cycle, the necessary performance of the cooling operation by the second vaporizing device 18 can be easily achieved.

Furthermore, since the high-pressure refrigerant at the outlet side of the heat radiating device 13, more specifically at the outlet side of the receiver 13a, is cooled down by the internal heat exchanger 21 through the heat exchange with the low-pressure refrigerant at the inlet side of the compressor 11, super cool of the high-pressure refrigerant can be further increased. The enthalpy of the refrigerant at the inlet sides of the first and second vaporizing devices 15 and 18 can be reduced. This means that an enthalpy difference of the refrigerant between the inlet sides and the outlet sides of the first and second vaporizing devices 15 and 18 can be enlarged, so that the performance of the cooling operation by the vaporizing devices 15 and 18 can be increased.

The refrigerating cycle with the internal heat exchanger 21 generally has a disadvantage that the temperature of the discharged refrigerant at the compressor 11 would become higher as a result that the super heat of the refrigerant at the inlet side of the compressor is increased. According to the embodiment of the present invention, however, the increase of the temperature of the discharged refrigerant from the compressor can be avoided by incorporating the internal heat exchanger 21 into the ejector type refrigerating cycle.

Figure 3:
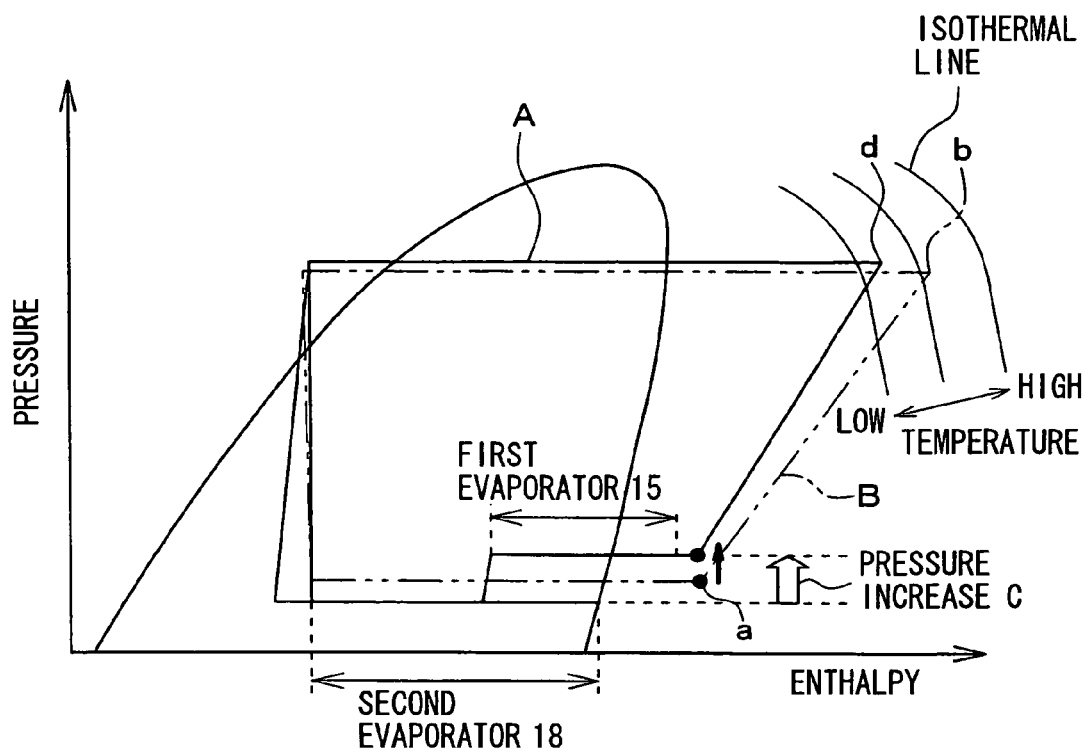
FIG. 3 is a Molier diagram showing an operation of the ejector type refrigerating cycle according to the first embodiment.
Figure 4:
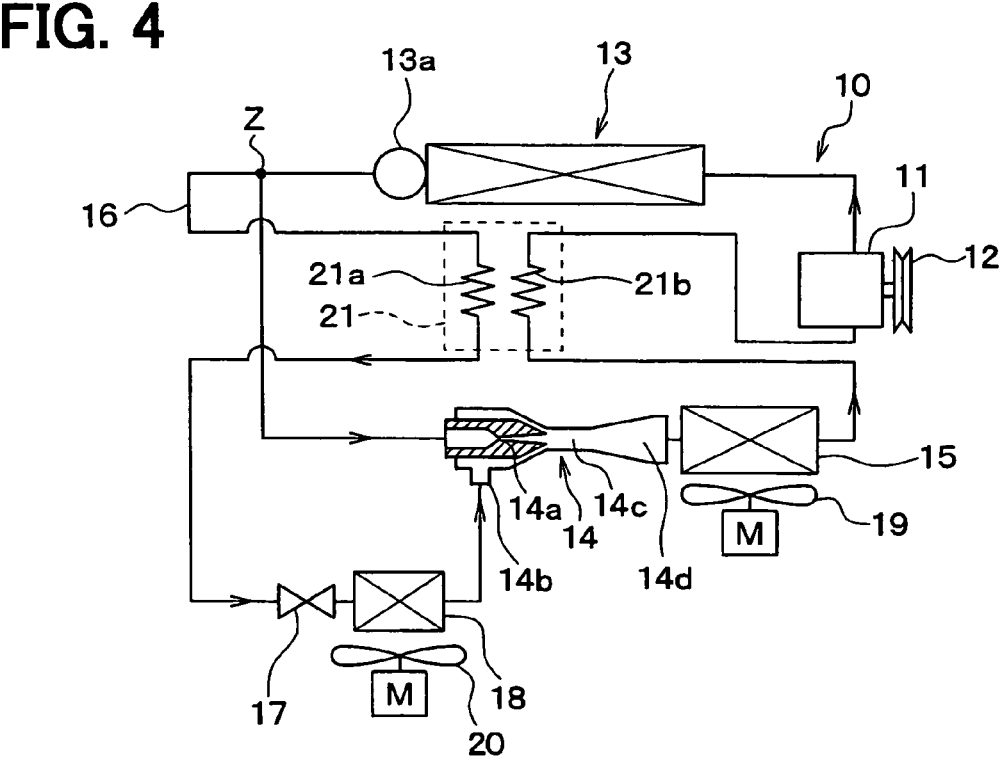
FIGS. 4 to 8 are schematic diagrams, respectively showing an ejector type refrigerating cycle according to second to sixth embodiments.

This will be explained with reference to a Molier diagram shown in FIG. 3. A solid line A is a Molier diagram of the ejector type refrigerating cycle incorporating the internal heat exchanger 21 according to the present invention, whereas a two-dot-chain line B is a Molier diagram of the refrigerating cycle (comparison example) having no ejector 14 but incorporating the internal heat exchanger 21. In the latter refrigerating cycle (comparison example), the first and second vaporizing devices 15 and 18 are connected in parallel with each other.

In the comparison example, a point "a" shows a condition of the refrigerant which has absorbed the heat through the heat exchange in the internal heat exchanger 21 (heated to the point "a") and will be sucked into the compressor. When the refrigerant is compressed to such a discharge pressure, which is determined by the cycle balance, the condition of the refrigerant moves from the point "a" to a point "b". As a result, the temperature of the refrigerant discharged from the compressor is increased to such a temperature, which is determined by the point "b". In FIG. 3, a right-hand side of each isothermal lines is a higher temperature side (enthalpy increased side), whereas a left-hand side of each isothermal lines is a lower temperature side (enthalpy decreased side).

According to the ejector type refrigerating cycle of the present invention, the evaporation pressure of the refrigerant at the first vaporizing device 15 becomes higher than that of the second vaporizing device 18, by a predetermined pressure increase amount "c", due to a pressure increasing effect at the defusing portion 14d of the ejector 14.

The pressure of the refrigerant to be sucked into the compressor 11 is thereby increased by the above pressure increase amount "c", so that a compression ratio at the compressor 11 can be made smaller. As a result, the condition of the discharged refrigerant from the compressor moves to a point "d". As shown in the drawing, when compared with the comparison example (the point "b"), the point "d", is moved to the lower temperature side of the isothermal line, so that the temperature of the discharged refrigerant from the compressor can be made lower than that of the comparison example.

According to the embodiment shown in FIG. 1, the compressor 11, the heat radiating device 13, the receiver 13a, and so on are arranged in an engine room of the vehicle, whereas the ejector 14, the first and second vaporizing devices 15, 18, the restricting device 17, the air blowing devices 19, 20 and so on are arranged in the passenger room. In the ordinary refrigerating cycle for the vehicle, two refrigerant pipe lines (for the high-pressure and low-pressure refrigerant) are necessary for connecting the components to be arranged in the engine room with the components to be arranged in the passenger room. According to the embodiment of the present invention, however, the components to be arranged in the engine room and in the passenger room can be connected with each other by one refrigerant pipe line (having the double pipe structure).

Accordingly, an assembling and mounting process of the refrigerating cycle into the vehicle can be made simpler and easier by use of the internal heat exchanger 21 having the double pipe structure.

Second Embodiment

FIG. 4

In the above first embodiment, the high-pressure side refrigerant passage 21a of the internal heat exchanger 21 is arranged at the upstream side of the bifurcating point Z for the bypass passage 16. According to a second embodiment, the high-pressure side refrigerant passage 21a of the internal heat exchanger 21 is arranged at the downstream side of the bifurcating point Z, namely at the upstream side of the restricting device 17 for the bypass passage 16.

According to the second embodiment, only the high-pressure refrigerant bifurcated to the bypass passage 16 is cooled down by the internal heat exchanger 21. The super cooling degree of the refrigerant is thereby increased, and the enthalpy of the refrigerant at the inlet side of the second vaporizing device 18 is reduced.

On the other hand, since the high-pressure refrigerant passing through the ejector 14 is not cooled down by the internal heat exchanger 21, the enthalpy of the refrigerant at the outlet side of the receiver 13a is maintained. Accordingly, it can be avoided that the expansion energy of the refrigerant at the inlet side (inlet port) of the ejector 14 would be decreased because of the internal heat exchanger 21.

The ejector type refrigerating cycle can be operated without decreasing the pressure increase amount at the defusing portion 14d of the ejector 14, even in the case that the internal heat exchanger 21 is provided. As a result, the evaporation pressure and the evaporation temperature of the refrigerant in the second vaporizing device 18 can be effectively reduced, so that the cooling capability of the second vaporizing device 18 can be improved.

Third Embodiment

FIG. 5

Figure 5:
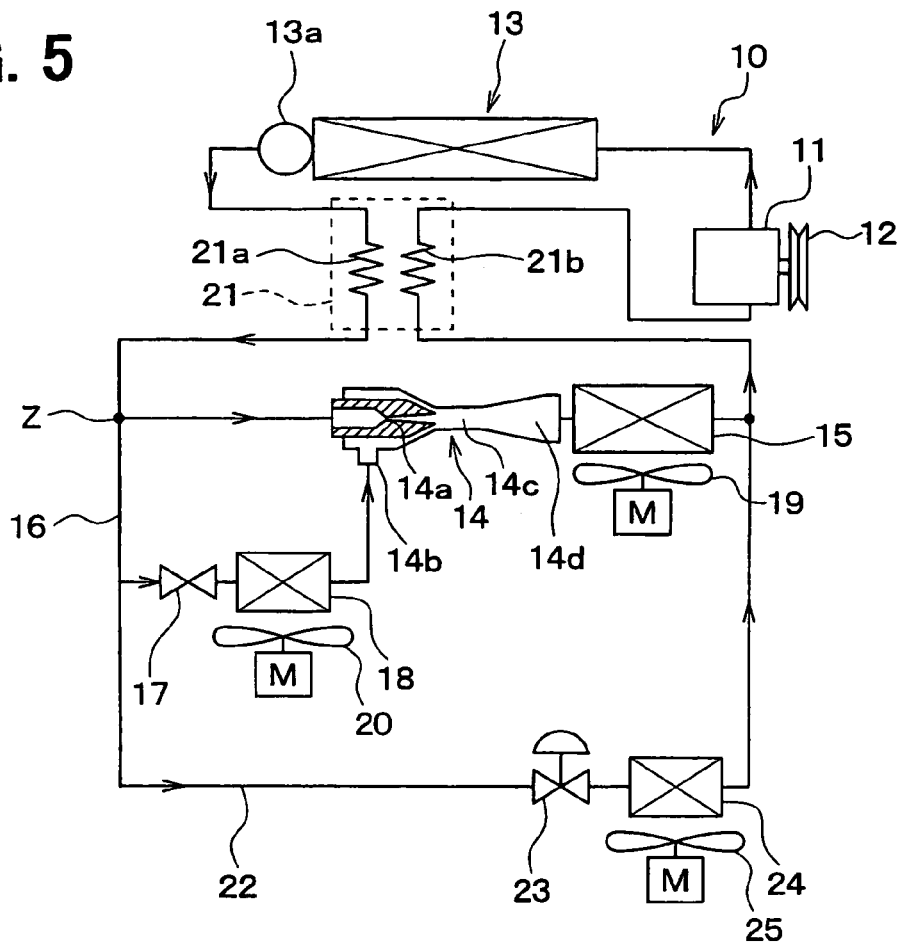

FIG. 5 shows a third embodiment, in which a second bypass passage 22 is added to the first embodiment. The second bypass passage 22 is bifurcated from the inlet side of the ejector 14 (the inlet side of the restricting device 17), and its downstream end is connected to the outlet side of the first vaporizing device 15.

A restricting device 23 and a third vaporizing device 24 are provided in the second bypass passage 22. The restricting device 23 is formed by a fixed restriction valve, such as a capillary tube, or an orifice, and operates as a depressurizing means for adjusting the refrigerant flow amount to the third vaporizing device 24. An electrically driven valve device can be used for the restriction device 23, so that a valve opening degree (a passage opening area) can be adjusted by an electromagnetic actuator. Air in a space, for which cooling operation is carried out, is blown to the third vaporizing device 24 by an air blowing device 25.

An outlet side of the third vaporizing device 24 is linked up with the outlet side of the first vaporizing device 15 and connected to the inlet side of the low-pressure side refrigerant passage 21b of the internal heat exchanger 21. The evaporation pressures of the refrigerant in the first and third vaporizing devices 15 and 24 become almost equal to each other. Namely, the evaporation temperatures of the refrigerant in the first and third vaporizing devices 15 and 24 become equal to each other.

In the above third embodiment, the first and second refrigerating circuits are formed in the same manner to the first embodiment. A third refrigerating circuit is formed by the compressor 11, the heat radiating device 13, the high-pressure side refrigerant passage 21a, the second bypass passage 2, the third vaporizing device 24, and the low-pressure side refrigerant passage 21b.

According to the third embodiment, an intended space for the cooling operation by the first vaporizing device 15 is, for example, a front seat passenger room, whereas an intended space for the cooling operation by the third vaporizing device 24 is a rear seat passenger room. Accordingly, the front and rear seat passenger rooms can be simultaneously and independently cooled by the respective first and third vaporizing devices 15 and 24.

In the case that the vehicle refrigerating apparatus is selected as an intended space for the cooling operation by the second vaporizing device 18, as in the same manner to the first embodiment, the refrigerating apparatus can be also simultaneously cooled together with the cooling operation for the front and rear seat passenger rooms.

When the internal heat exchanger 21 is formed by the double pipe structure in the second and third embodiments, the assembling and mounting process of the refrigerating cycle to the vehicle can be made easier, as in the same manner to the first embodiment.

Fourth Embodiment

FIG. 6

Figure 6:
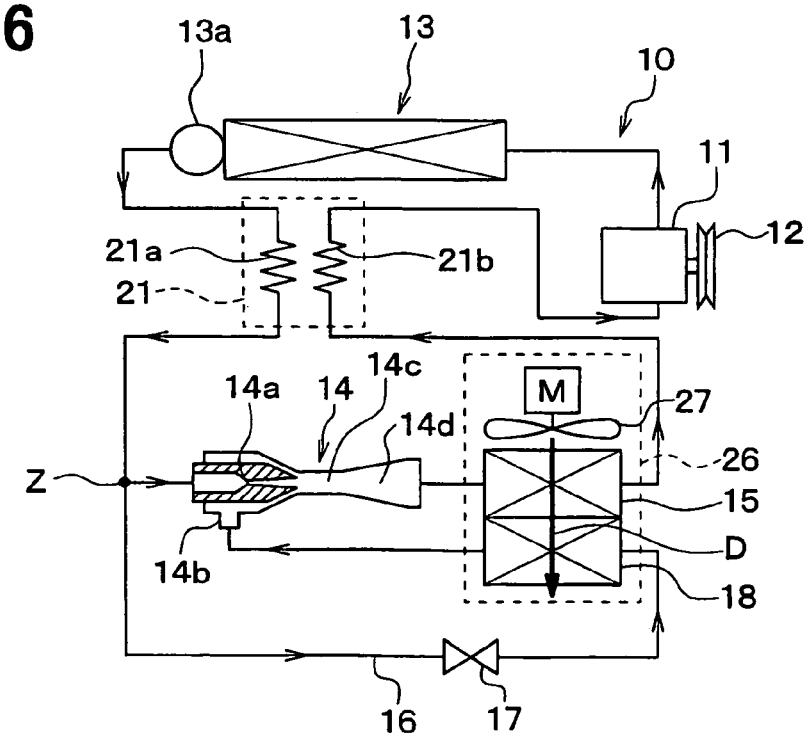

In the first embodiment, the first and second vaporizing devices 15 and 18 are independently constructed to respectively perform the cooling operation. According to a fourth embodiment, as shown in FIG. 6, the first and second vaporizing devices 15 and 18 are formed into a unitary structure and arranged in one common casing 26.

According to such structure, the first and second vaporizing devices 15 and 18 can be handled as one unit, so that an assembling process of the first and second vaporizing devices 15 and 18 into the casing 26 can be made simpler.

The vehicle passenger room or the vehicle refrigerating apparatus is selected as an intended common space for the cooling operation by the first and second vaporizing devices 15 and 18.

According to the fourth embodiment, therefore, a common air blowing device 27 is provided for blowing the air to the first and second vaporizing devices 15 and 18. In this embodiment, the first vaporizing device 15, in which the evaporation temperature of the refrigerant is higher, is arranged at an upstream side of the blowing air (indicated by an arrow "D") from the air blowing device 27, whereas the second vaporizing device 18, in which the evaporation temperature of the refrigerant is lower, is arranged at a downstream side of the blowing air (indicated by the arrow "D").

With such a structure, a temperature difference can be realized between the evaporation temperature of the refrigerant at the first vaporizing device 15 and the blowing air and between the evaporation temperature of the refrigerant at the second vaporizing device 18 and the blowing air. The first and second vaporizing devices 15 and 18 can effectively bring out the cooling capability. The cooling capability by the first and second vaporizing devices 15 and 18 to the common intended space for the cooling operation can be effectively improved in its combination.

In the above fourth embodiment, parts for the vaporizing devices 15 and 18, such as tubes, fins, tanks and so on, are preferably formed from metal material, such as aluminum or the like, and those parts are integrally brazed to each other, so that the vaporizing devices can be manufactured with high productivity.

Fifth Embodiment

FIG. 7

Figure 7:
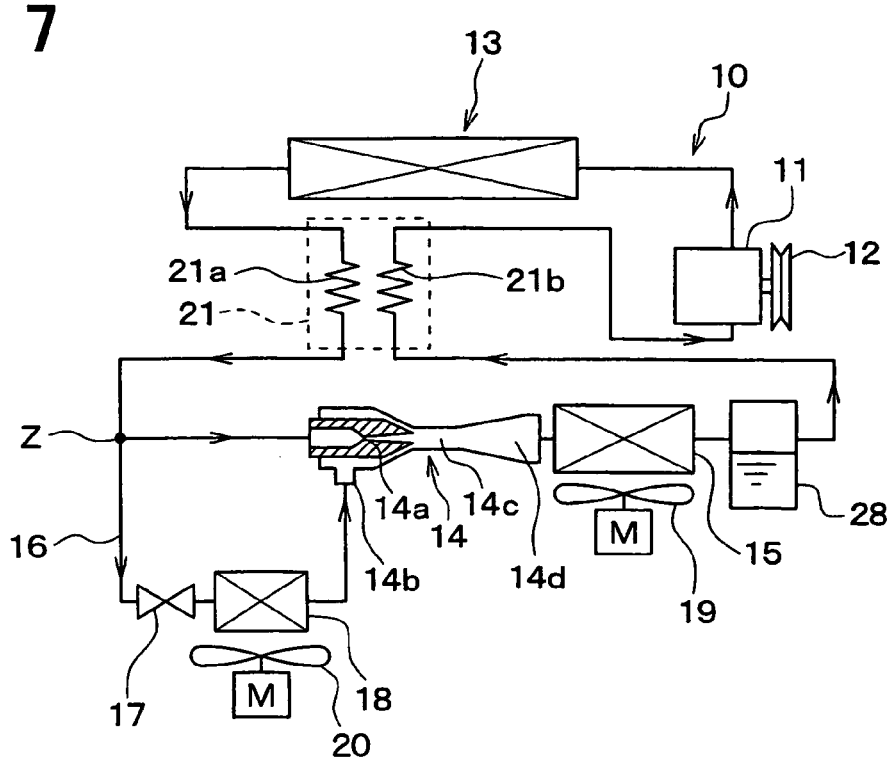

In the above first to fourth embodiments, the receiver 13a (the gas-liquid separator) is provided at the outlet side of the heat radiating device 13. According to a fifth embodiment, as shown in FIG. 7, the receiver 13a is eliminated, and an accumulator 28 is instead provided between the outlet side of the first vaporizing device 15 and the low-pressure side refrigerant passage 21b of the internal heat exchanger 21. The accumulator 28 is formed into an elongated tank, to operate as the gas-liquid separator for separating the refrigerant from the first vaporizing device 15 into gas phase and liquid phase refrigerant.

The accumulator 28 separates the refrigerant into the gas phase and liquid phase refrigerants by use of difference of the refrigerant density, and accumulate the liquid phase refrigerant at its bottom portion and sends out the gas phase refrigerant to the low-pressure side refrigerant passage 21b of the internal heat exchanger 21. A well known oil returning mechanism (not shown) is provided in the bottom of the tank (the accumulator 28), in order to return lubricating oil included in the liquid phase refrigerant to the inlet side of the compressor 11.

Sixth Embodiment

FIG. 8

Figure 8:
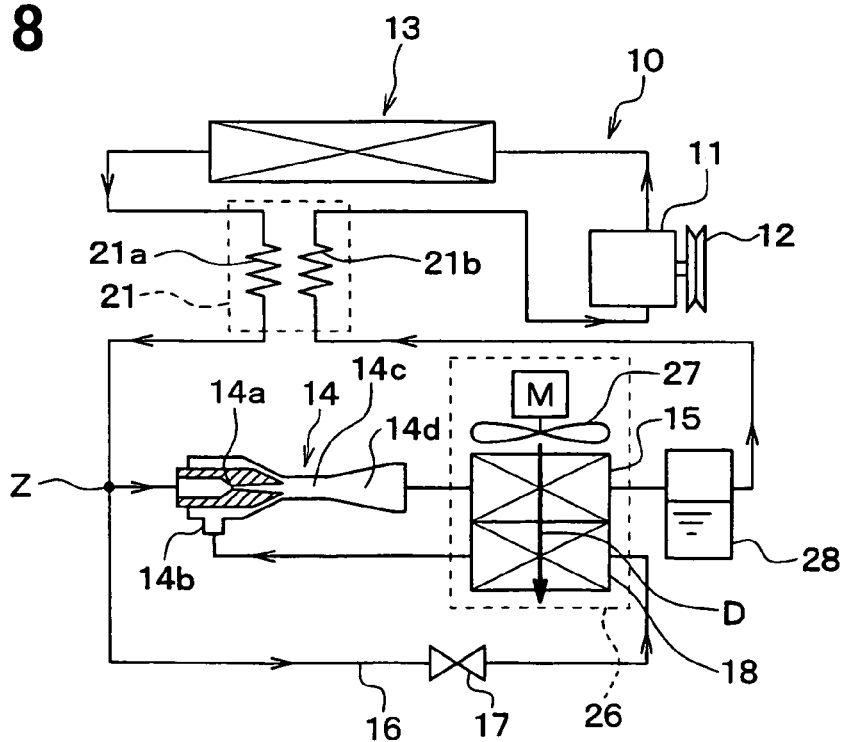

In a sixth embodiment, as shown in FIG. 8, the first and second vaporizing devices 15 and 18 are integrally formed into one unit as in the fourth embodiment (FIG. 6), and the accumulator 28 is provided instead of the receiver 13a as in the fifth embodiment (FIG. 7).

In the above fifth and sixth embodiments (FIGS. 7 and 8), the accumulator 28 is provided between the outlet side of the first vaporizing device 15 and the inlet side of the low-pressure side refrigerant passage 21b of the internal heat exchanger 21. The second bypass passage 22, which is shown in the third embodiment (FIG. 5), may be added to the above fifth and sixth embodiments. In such a case, the outlet side of the second bypass passage 22 is generally connected to the inlet side of the accumulator 28. However, the outlet side of the second bypass passage 22 can be also connected to the outlet side of the accumulator 28.

Figure 9:
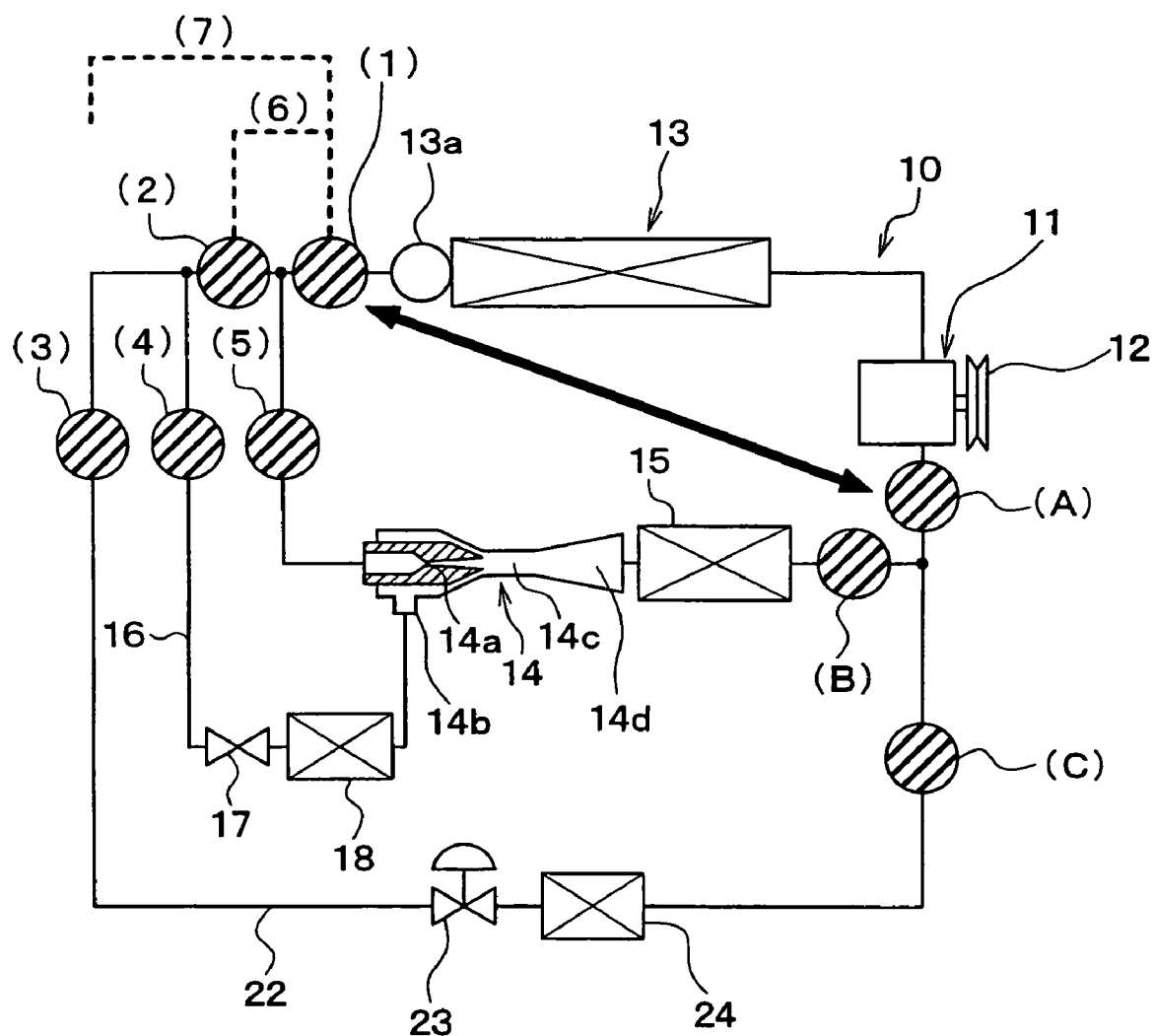
FIG. 9 is a schematic refrigerant circuit diagram showing variations of the refrigerant circuit for the internal heat exchanger according to the first to sixth embodiments.

Variations for the Refrigerant Passages of the Internal Heat Exchanger 21, in the First to Sixth Embodiments The high-pressure side and low-pressure side refrigerant passages 21a and 21b of the internal heat exchanger 21 can be arranged in various ways, as shown in FIG. 9.

More specifically, the high-pressure side refrigerant passage 21a can be arranged at any one of the positions indicated by numerals (1) to (7) in FIG. 9. In FIG. 9, the numeral (6) means the case, in which the high-pressure side refrigerant passage 21a is provided at both positions (1) and (2), and the numeral (7) shows the case, in which the high-pressure side refrigerant passage 21a is provided at three positions (1), (2) and (3).

On the other hand, the low-pressure side refrigerant passage 21b can be arranged at any one of the positions indicated by references (A) to (C) in FIG. 9.

Accordingly, there are seven different positions for the high-pressure side refrigerant passage 21a, whereas there are three different positions for the low-pressure side refrigerant passage 21b. This means that there are in total twenty-one different combinations for the positions of the high-pressure and low-pressure side refrigerant passages.

Seventh Embodiment

FIG. 10

Figure 10:
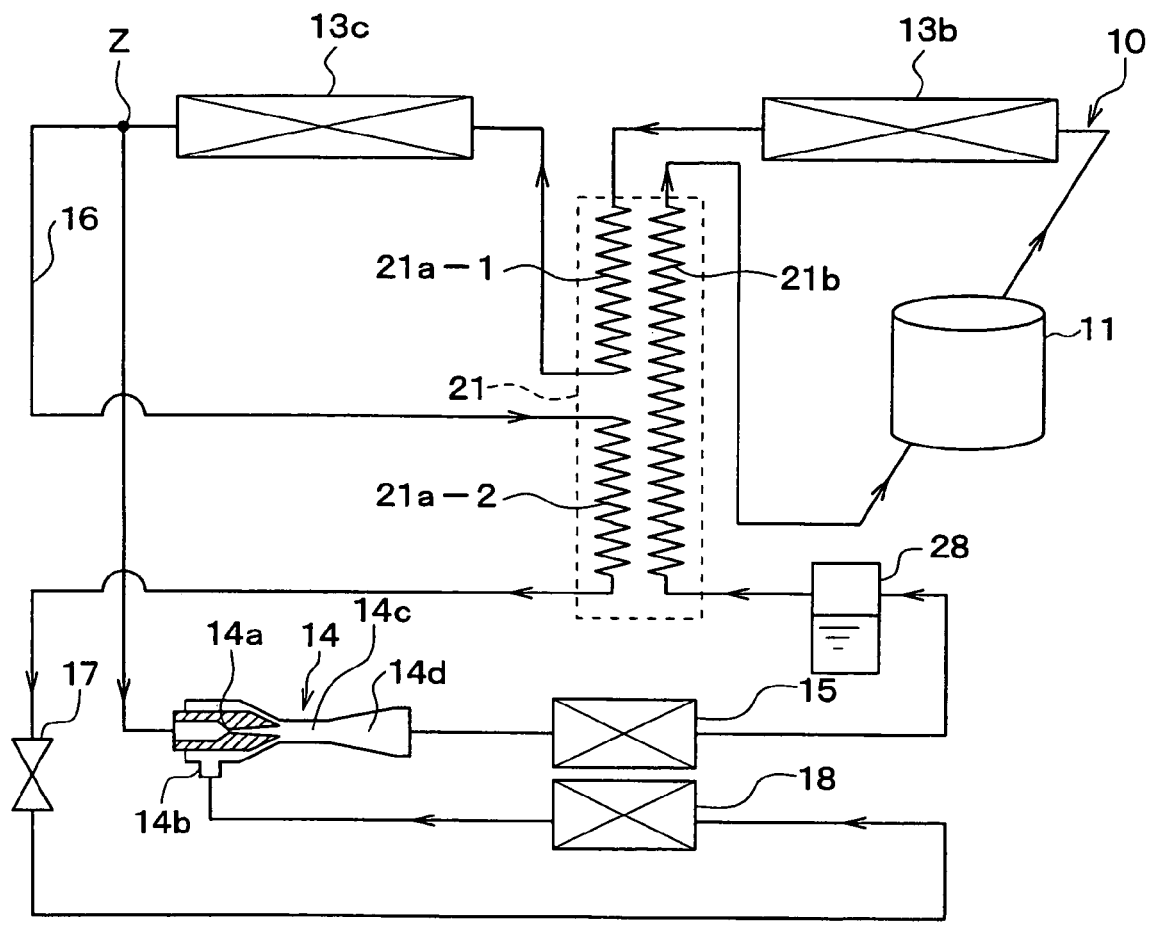
FIGS. 10 to 19 are schematic diagrams, respectively showing an ejector type refrigerating cycle according to seventh to sixteenth embodiments.

In the above first to sixth embodiments and in the variations of the refrigerant passages of the internal heat exchanger shown in FIG. 9, the high-pressure side refrigerant passage 21a is arranged at the outlet side of the heat radiating device 13. According to a seventh embodiment shown in FIG. 10, the heat radiating device is divided into a first heat radiating device 13b arranged at the upstream side of the refrigerant flow, and a second heat radiating device 13c arranged at the downstream side of the refrigerant flow, a first portion 21a-1 of the high-pressure side refrigerant passage is provided between the first and second heat radiating devices 13b and 13c, and a second portion 21a-2 of the high-pressure side refrigerant passage is provided in the bypass passage 16 and between the bifurcating point Z and the restricting device 17.

In the above seventh embodiment, the heat radiating device is divided into the first and second heat radiating devices 13b and 13c, as described above. This is because, for example in the refrigerating cycle for a household refrigerator, heat radiating devices are dispersed to multiple spaces of the refrigerator. A cooling fan (not shown) is provided at the first heat radiating device 13b, so that the heat radiation of the refrigerant is carried out by forced convection, whereas no cooling fan is provided at the second heat radiating device 13c, in order that the heat radiation of the refrigerant is carried out by natural convection.

Since the second part 21a-2 of the high-pressure side refrigerant passage of the internal heat exchanger 21 is provided at the downstream side of the second heat radiating device 13c, the high-pressure refrigerant flows into the second part 21a-2 after having radiated the heat at the first and second heat radiating devices 13b and 13c. The refrigerant temperature in the second part 21a-2 is, therefore, lower than that in the first part 21a-1.

The internal heat exchanger 21 is arranged such that the refrigerant in the low-pressure side refrigerant passage 21b is heat exchanged at first with the refrigerant flowing in the second part 21a-2 of the high-pressure side refrigerant passage 21, and then further heat exchanged with the refrigerant flowing in the first part 21a-1 of the high-pressure side refrigerant passage 21.

As above, the refrigerant flow in the first and second parts 21a-1 and 21a-2 of the high-pressure side refrigerant passage and the refrigerant flow in the low-pressure side refrigerant passage 21b are formed in a countercurrent relation, so that heat exchange performance of the internal heat exchanger 21 can be improved.

In the case that an electrically driven compressor is used for the compressor 11, dew drops are likely to be produced at a surface of the refrigerant suction side pipe, because temperature at such surface portion becomes low. As a result, an electrical trouble, such as a short-circuit in electrical circuit portions, may be easily caused by water component of the dew drops.

According to the seventh embodiment, the first part 21a-1 of the high-pressure refrigerant passage of the internal heat exchanger 21 is provided between the first and second heat radiating devices 13b and 13c, and the gas phase and liquid phase refrigerant (both of which are in the compressed condition) flow through the first part 21a-1 of the high-pressure refrigerant passage. This results in that the refrigerant temperature in the first part 21a-1 is higher than that of the refrigerant (which is in the super cooled condition) having passed through the second heat radiating device 13c.

Accordingly, in the heat exchange between the first part 21a-1 of the high-pressure side refrigerant passage and the outlet side of the low-pressure side refrigerant passage 21b, the temperature difference is increased between the high-pressure and low-pressure refrigerants, and thereby the heat exchange amount can be enlarged. As a result, the temperature of the refrigerant to be sucked into the compressor 11 can be controlled at a higher value than a dew point of the air surrounding the compressor, so that the production of the dew drops at the refrigerant suction pipe is prevented. The electrical trouble, such as a short-circuit in electrical circuit portions, can be thus avoided.

In the above seventh embodiment, multiple parts 21a-1 and 21a-2 of the high-pressure side refrigerant passage are combined with one low-pressure side refrigerant passage 21b. As understood from FIG. 9, however, multiple parts of the low-pressure side refrigerant passage may be combined with one high-pressure side refrigerant passage. Furthermore, the multiple parts of the high-pressure side refrigerant passage can be combined with multiple parts of the low-pressure side refrigerant passage, as well.

According to the above seventh embodiment, the heat radiating device is divided into the first heat radiating device 13b at the upstream side of the refrigerant flow and the second heat radiating device 13c at the downstream side of the refrigerant flow, and the first part 21a-1 of the high-pressure refrigerant passage of the internal heat exchanger 21 is provided between the first and second heat radiating devices 13b and 13c. However, the first part 21a-1 of the high-pressure refrigerant passage may be provided in the refrigerant passage for the discharged refrigerant from the compressor 11, namely in the refrigerant passage connected to the inlet side of the heat radiating device.

Eighth Embodiment

FIG. 11

Figure 11:
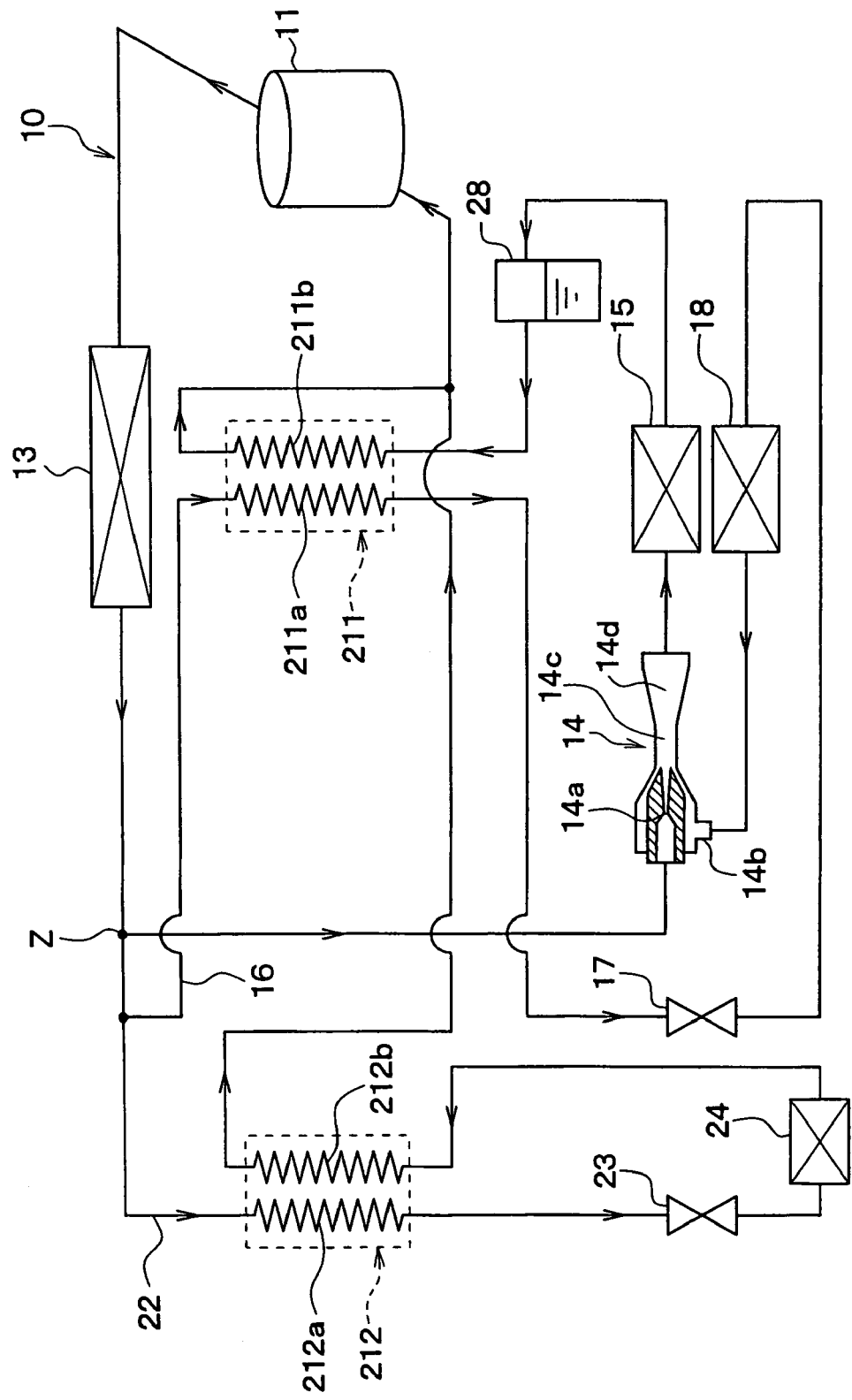

FIG. 11 shows an eighth embodiment, in which the internal heat exchanger comprises multiple (two) parts, namely first and second internal heat exchangers 211 and 212, which are arranged at different points of the refrigerating cycle.

More specifically, the second bypass passage 22 is provided in parallel with the first bypass passage 16, as in the same manner to the third embodiment of FIG. 5, wherein the restricting device 23 and the third vaporizing device 24 are provided in the second bypass passage 22.

The first internal heat exchanger 211 is constructed that the heat exchange is carried out between a high-pressure side refrigerant passage 211a, which is arranged at the inlet side of the restricting device 17 of the first bypass passage 16, and a low-pressure side refrigerant passage 211b, which is arranged at the outlet side of the accumulator 28.

On the other hand, the second internal heat exchanger 212 is constructed that the heat exchange is carried out between a high-pressure side refrigerant passage 212a, which is arranged at the inlet side of the restricting device 23 of the second bypass passage 22, and a low-pressure side refrigerant passage 212b, which is arranged at the outlet side of the third vaporizing device 24.

An outlet side of the low-pressure side refrigerant passage 212b of the second internal heat exchanger 212 is linked up with the outlet side of the low-pressure side refrigerant passage 211b of the first internal heat exchanger 211, and connected to the inlet side of the compressor 11.

The high-pressure side refrigerant passage 211a of the first internal heat exchanger 211 of this eighth embodiment corresponds to the numeral (4) in FIG. 9, whereas the low-pressure side refrigerant passage 211b corresponds to the reference (B) in FIG. 9. Further, the high-pressure side refrigerant passage 212a of the second internal heat exchanger 212 corresponds to the numeral (3) in FIG. 9, whereas the low-pressure side refrigerant passage 212b corresponds to the reference (C) in FIG. 9.

According to the above eighth embodiment, the first and second internal heat exchangers 211 and 212 are respectively provided in the first and second bypass passages 16 and 22. This means that the heat exchange amount in the first internal heat exchanger 211 can be independently designed so that the cooling capability can be effectively brought out at the second vaporizing device 18. And in the same manner to the above, the heat exchange amount in the second internal heat exchanger 212 can be independently designed so that the cooling capability can be effectively brought out at the third vaporizing device 24.

In the above seventh and eighth embodiments, the intended spaces for the cooling operations by the first and second vaporizing devices 15 and 18 can be independent two spaces, or can be single common space. For example, the former case corresponds to the first to third embodiments (FIGS. 1, 4, 5 and 7), whereas the latter case corresponds to the fourth and sixth embodiments (FIGS. 6 and 8).

Ninth Embodiment

FIG. 12

Figure 12:
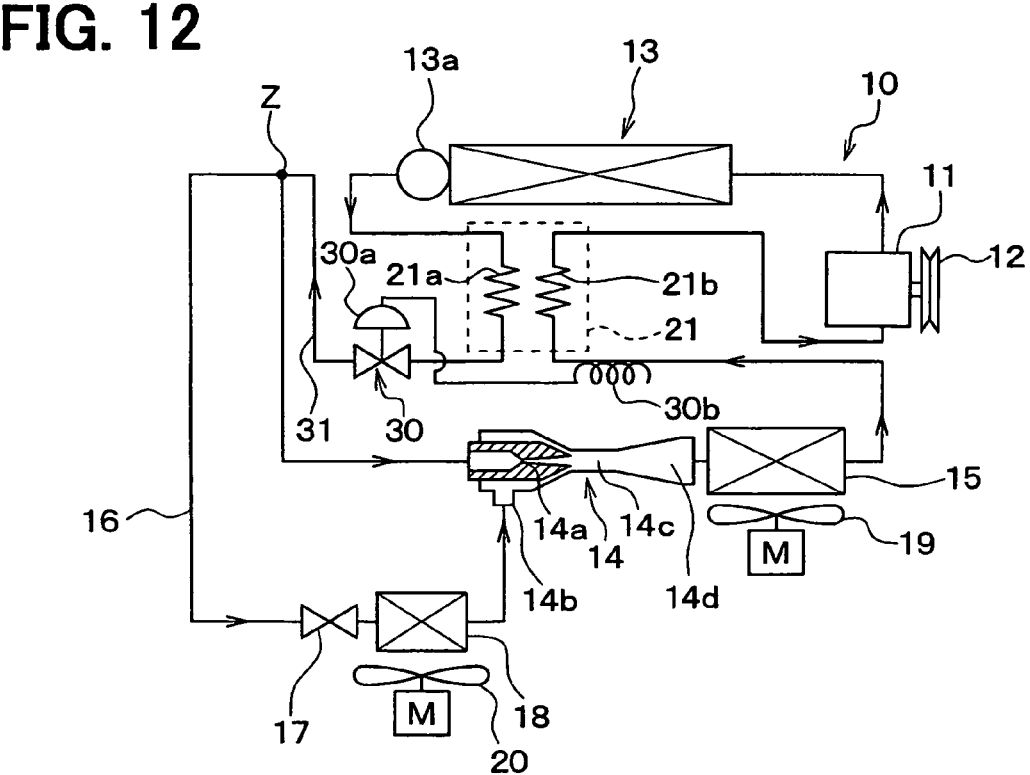

FIG. 12 shows a ninth embodiment, in which a temperature dependent type expansion valve 30 is added to the refrigerating cycle of the first embodiment (FIG. 1).

The expansion valve 30 is arranged in a refrigerant passage 31, which is provided between the high-pressure side refrigerant passage 21a of the internal heat exchanger 21 and the bifurcating point Z of the bypass passage 16 (namely, at the upstream side of the bifurcating point Z). The expansion valve 30 adjusts an opening degree (an opening area of the refrigerant passage), so that a super heat degree of the refrigerant at the outlet side of the first vaporizing device 15 is controlled at a predetermined value.

The expansion valve 30, therefore, comprises a valve body (not shown) for adjusting a valve opening degree (the opening area of the refrigerant passage) for the refrigerant passage 31, and a valve driving mechanism 30a for driving the valve body.

The valve driving mechanism 30a has a well known structure, which comprises a temperature sensing portion 30b for sensing the temperature of the refrigerant at the outlet side of the first vaporizing device 15, and a pressure responding member, such as a diaphragm, which is displaced in response to the pressure corresponding to the sensed temperature of the refrigerant at the outlet side of the first vaporizing device 15 as well as the pressure of the refrigerant at the outlet side of the first vaporizing device 15. The valve body (not shown) of the expansion valve 30 is driven to move by the displacement of the diaphragm. For that purpose, the refrigerant pressure at the outlet side of the first vaporizing device 15 is introduced into the valve driving mechanism 30a, via a pressure introduction passage (not shown).

Characteristic features of the ninth embodiment will be explained. The high-pressure refrigerant from the heat radiating device 13 is depressurized (first depressurization) when the refrigerant passes through the expansion valve 30, so that the refrigerant pressure is decreased to a predetermined intermediate pressure. The refrigerant of the intermediate pressure is bifurcated at the bifurcating point Z, so that it is divided into the refrigerant flow to the ejector 14 and the refrigerant flow to the bypass passage 16. Those refrigerants are further depressurized (second depressurization) by the ejector 14 and the restricting device 17, respectively, and the refrigerant pressure is decreased to a predetermined low pressure.

Since the temperature dependent type expansion valve 30 is provided in the refrigerant passage 31 at the upstream side of the bifurcating point Z, the total refrigerant flow amount to the first and second vaporizing devices 15 and 18 can be properly controlled by adjusting the valve opening degree (the opening area of the passage) for the refrigerant passage 31, so that the super heat degree of the refrigerant at the outlet side of the first vaporizing device 15 controlled at the predetermined value.

Since the refrigerant from the first vaporizing device 15 is sucked into the compressor 11, after the refrigerant has absorbed the heat when passing through the low-pressure side refrigerant passage 21b of the internal heat exchanger 21, returning of the liquid phase refrigerant to the compressor 11 can be surely prevented, even in the case that the refrigerant condition immediately from the first vaporizing device 15 is controlled by the expansion valve 30 so as to be the condition equal to or close to the saturated gas having the super heat degree of 0° C.

Furthermore, the refrigerant flow amount can be controlled so that almost all the liquid phase refrigerant is evaporated in the first vaporizing device 15, by controlling the refrigerant condition immediately from the first vaporizing device 15 to be the condition equal or close to the saturated gas having the super heat degree of 0° C. As above, the heat absorbing operation of the latent heat can be carried out at the whole area of the first vaporizing device 15 through the evaporation of the liquid phase refrigerant, without causing the return of the liquid phase refrigerant to the compressor 11. As a result, high cooling capability can be brought out at the first vaporizing device 15.

In the ninth embodiment, the super cooling degree of the high-pressure refrigerant at the upstream side of the expansion valve 30 can be also increased by the internal heat exchanger 21, and the enthalpy difference of the refrigerant between the inlet and outlet sides of the first and second vaporizing devices 15 and 18 can be thereby increased, so that the cooling capability at the vaporizing devices 15 and 18 is enhanced. The temperature increase of the refrigerant at the outlet side of the compressor 11, which might occur in the ejector type refrigerating cycle, as explained in FIG. 3, can be prevented by the use of the internal heat exchanger 21. This effect is the same to that of the first embodiment.

Since the low-pressure side refrigerant passage 21b of the internal heat exchanger 21 is provided at the downstream side of the first vaporizing device 15, the refrigerant flow amount may be alternatively controlled by the expansion valve 30, so that the refrigerant immediately from the first vaporizing device 15 is in such a condition, that the gas phase and liquid phase refrigerants are mixed (close to the condition of a dry rate of 1 (=the super heat degree of 0° C.)).

The expansion valve 30 may not be necessarily composed of a pure mechanical structure. Instead, an electrical expansion valve can be used as the expansion valve 30, which electrically adjusts the valve opening degree (the opening area of the refrigerant passage) in accordance with detected electrical signals from a refrigerant temperature sensor and a refrigerant pressure sensor.

Tenth Embodiment

FIG. 13

Figure 13:
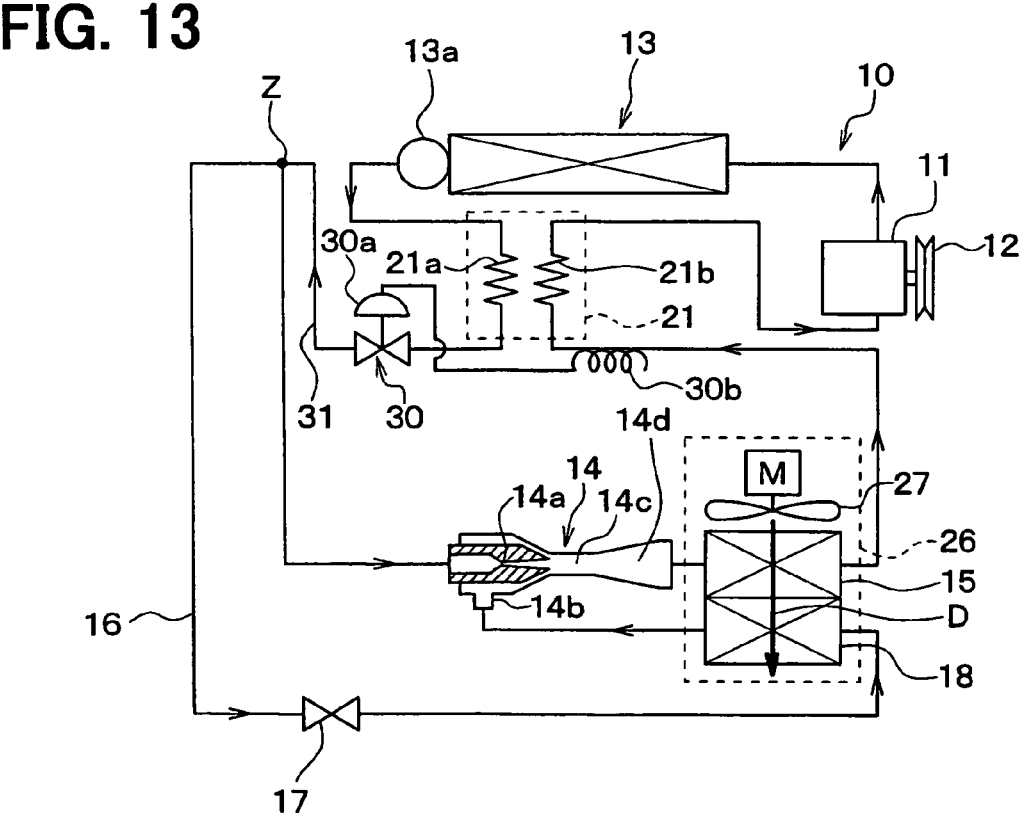

FIG. 13 shows a tenth embodiment, which differs from the above ninth embodiment in that the first and second vaporizing devices 15 and 18 are integrally formed into one unit, which is the same to the unitary structure of the fourth embodiment (FIG. 6).

Eleventh Embodiment

FIG. 14

Figure 14:
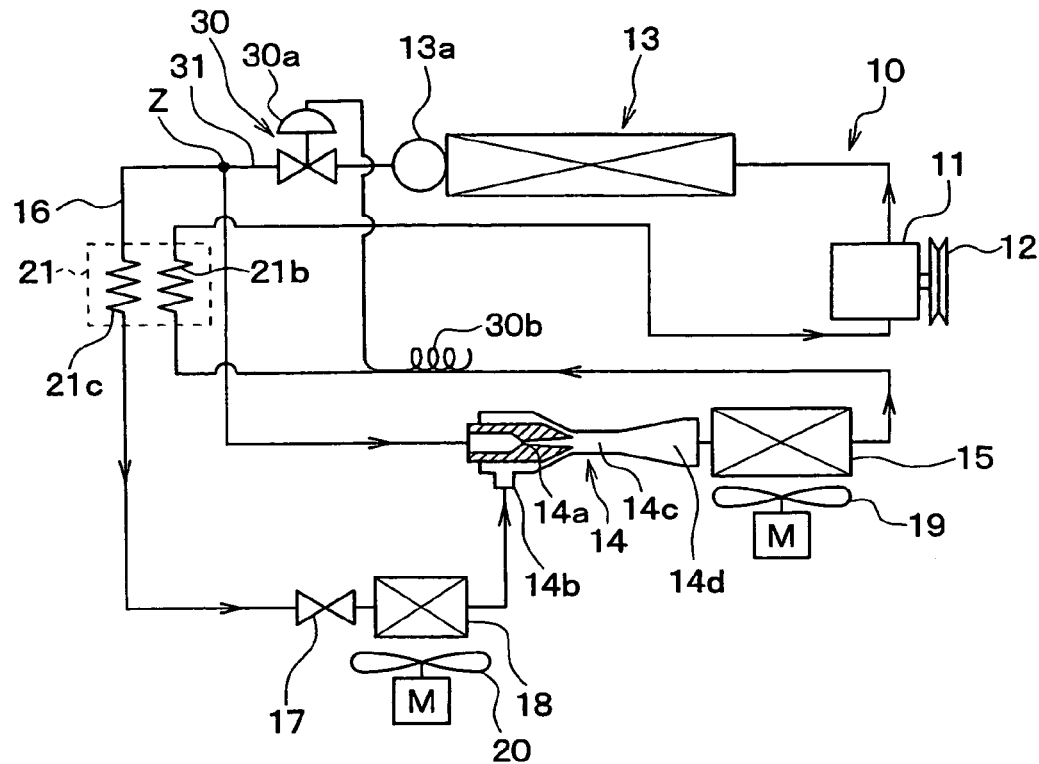

In the above ninth embodiment, the temperature dependent type expansion valve 30 is provided at the downstream side of the high-pressure side passage 21a of the internal heat exchanger 21, and the heat exchange is carried out between the high-pressure refrigerant in the high-pressure side refrigerant passage 21a and the low-pressure refrigerant passing through the low-pressure side refrigerant passage 21b of the internal heat exchanger 21 and flowing to the compressor 11. According to an eleventh embodiment, however, as shown in FIG. 14, the internal heat exchanger 21 comprises an intermediate-pressure side refrigerant passage 21c and the low-pressure side refrigerant passage 21b, wherein the intermediate-pressure side refrigerant passage 21c is provided at the outlet side of the expansion valve 30. The heat exchange is carried out between the intermediate-pressure refrigerant in the intermediate-pressure side refrigerant passage 21c and the low-pressure refrigerant passing through the low-pressure side refrigerant passage 21b of the internal heat exchanger 21 and flowing to the compressor 11.

More specifically, the intermediate-pressure side refrigerant passage 21c is provided at the inlet side of the restricting device 17 of the bypass passage 16. Therefore, the refrigerant of the intermediate-pressure flows through the intermediate-pressure side refrigerant passage 21c of the internal heat exchanger 21, wherein the refrigerant pressure is between the pressure at the outlet side of the expansion valve 30 and the pressure at the inlet side of the restricting device 17.

Since the intermediate-pressure side refrigerant passage 21c of the internal heat exchanger 21 is arranged to be in parallel to the inlet side passage for the ejector 14, the refrigerant of the intermediate-pressure having passed through the expansion valve 30 is introduced into the nozzle portion 14a of ejector 14, without internal heat exchange (heat radiation). Accordingly, the eleventh embodiment brings out the following effects.

In the case that the intermediate-pressure refrigerant flowing into the nozzle portion 14a of the ejector 14 were heat exchanged (internal heat exchange), the enthalpy of the refrigerant is decreased by heat radiation to the low-pressure refrigerant. The depressurizing operation at the nozzle portion 14a is carried out in the isentropic manner. An inclination of an isentropic curve is decreased due to physicality of the refrigerant in accordance with a decrease of the enthalpy in the Molier diagram.

As a result, when the enthalpy of the intermediate-pressure refrigerant flowing into the nozzle portion 14a of the ejector 14 is decreased, the pressure increase amount at the defusing portion 14d of the ejector 14 is decreased, because collected amount of dissipation at the refrigerant expansion in the nozzle portion 14a is decreased.

According to the eleventh embodiment, however, only the refrigerant in the bypass passage 16 is heat exchanged, while the refrigerant of the intermediate-pressure is introduced directly from the expansion valve 30 into the nozzle portion 14a of the ejector 14 without internal heat exchange. As a result, the possible decrease of the refrigerant enthalpy due to the internal heat exchange is avoided, so that sufficient amount for the collection of the dissipation can be assured and sufficient pressure increase amount at the defusing portion 14d can be obtained.

The refrigerant of the intermediate-pressure in the bypass passage 16 is super cooled by the internal heat exchange (heat radiation) to decrease its enthalpy, so that the cooling capability at the second vaporizing device 18 can be improved.

Twelfth Embodiment

FIG. 15

Figure 15:
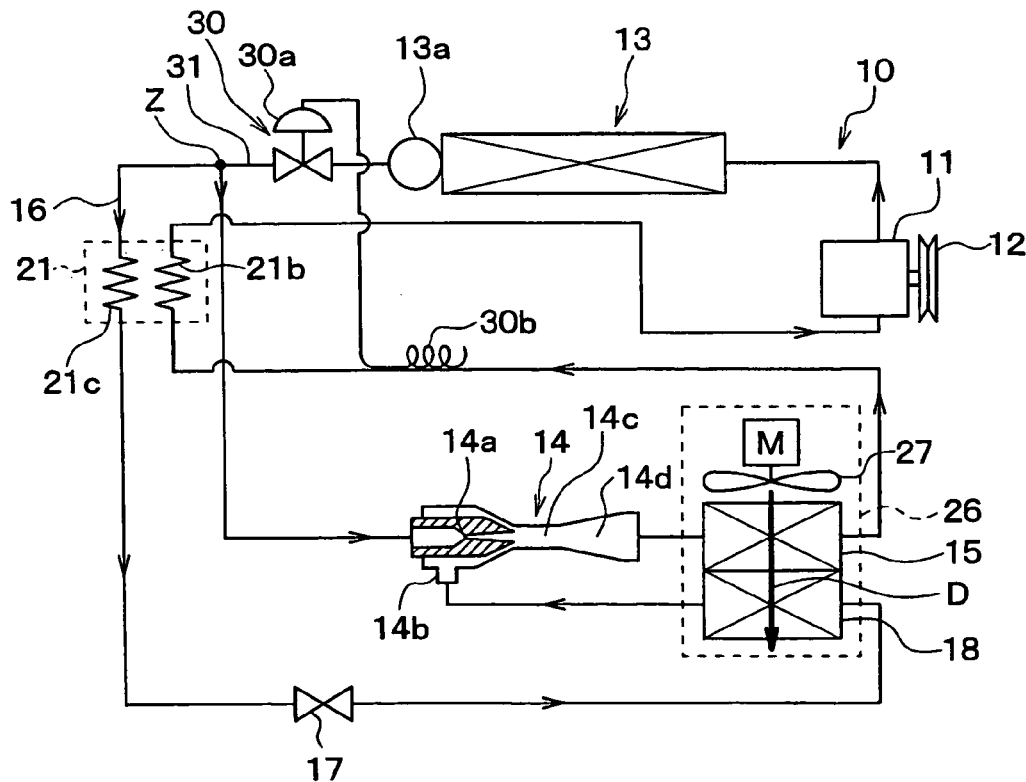

FIG. 15 shows a twelfth embodiment, which differs from the above eleventh embodiment (FIG. 14) in that the first and second vaporizing devices 15 and 18 are integrally formed into one unit, which is the same to the unitary structure of the fourth embodiment (FIG. 6).

Thirteenth Embodiment

FIG. 16

Figure 16:
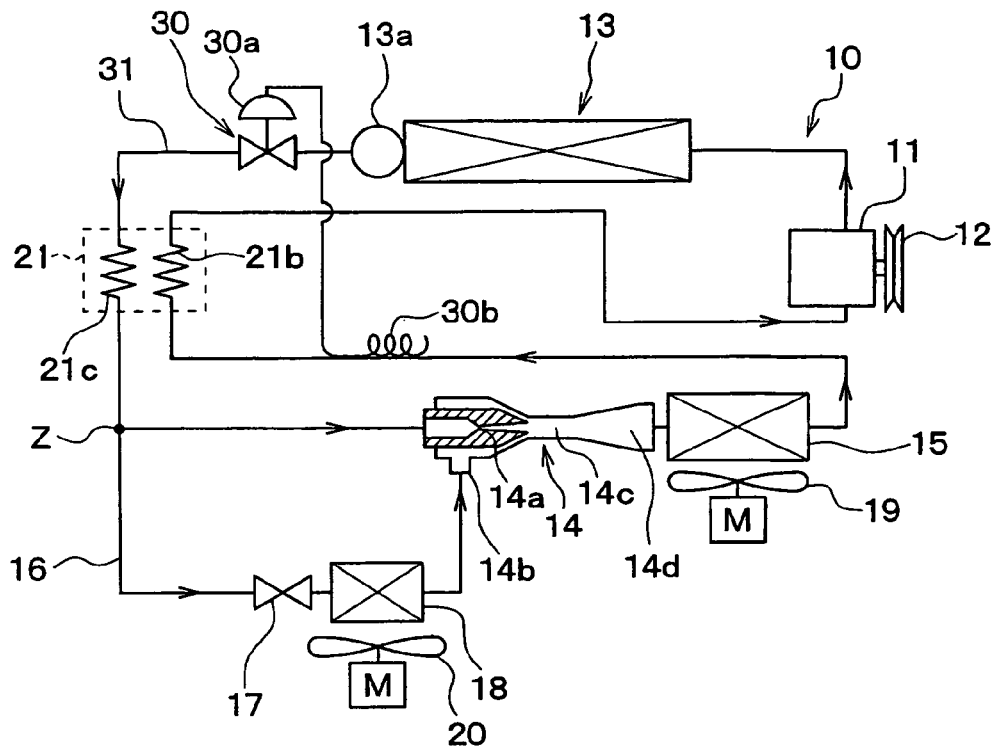

FIG. 16 shows a thirteenth embodiment, which differs from the above eleventh embodiment (FIG. 14) in that the refrigerant passage 21c of the internal heat exchanger 21 is arranged at the upstream side of the bifurcating point Z.

The high-pressure refrigerant from the heat radiating device 13 is depressurized by the primary depressurizing operation at the expansion valve 30 to the gas-liquid phase refrigerant of the intermediate-pressure.

According to the above eleventh embodiment (FIG. 14), the gas-liquid refrigerant of the intermediate-pressure is directly introduced into the nozzle portion of the ejector 14, as explained above. Since the gas-liquid refrigerant includes a certain percentage of the gas phase refrigerant, unsteady flow of air bubbles may be produced when the refrigerant passes through the nozzle portion 14a. And the nozzle portion 14a may be vibrated to generate a noise of the refrigerant flow.

According to the thirteenth embodiment, the refrigerant of the intermediate-pressure is liquefied by heat radiation to the low-pressure refrigerant at the refrigerant passage 21c, after having passed through the expansion valve 30. As a result, the liquid phase refrigerant having a predetermined super cooling degree flows into both of the restricting device 17 of the bypass passage 16 and the nozzle portion 14a of the ejector 14.

The unsteady flow of the air bubbles can be suppressed in the restricting device 17 and the nozzle portion 14a, the generation of the noise by the refrigerant flow can be suppressed.

Fourteenth Embodiment

FIG. 17

Figure 17:
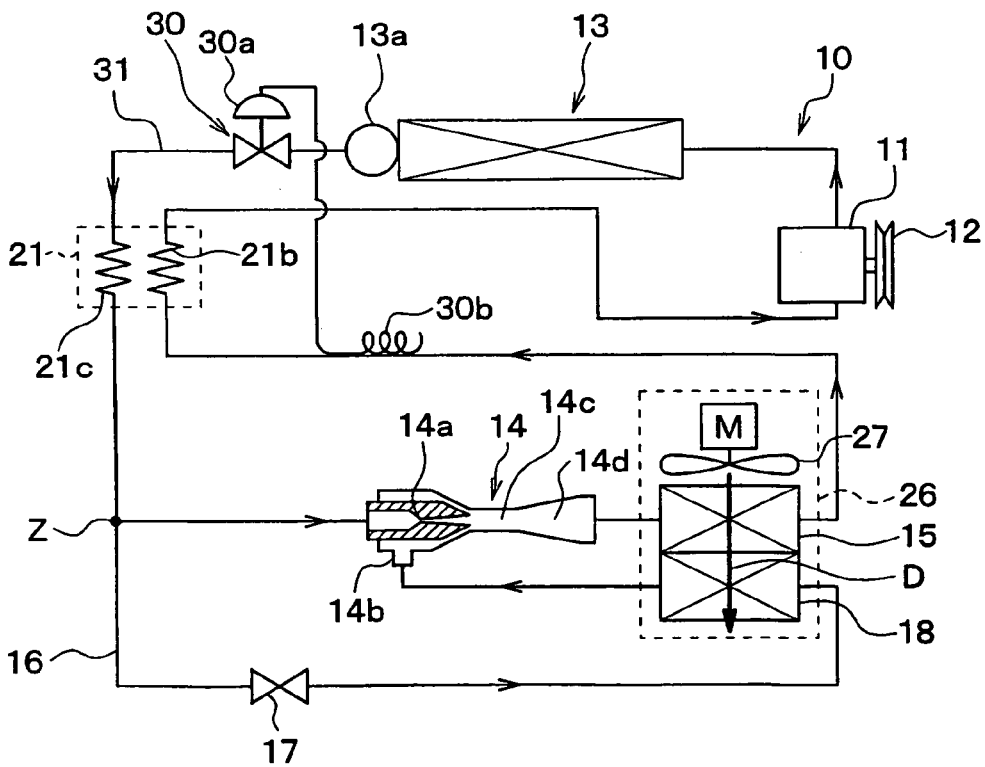

FIG. 17 shows a fourteenth embodiment, which differs from the above thirteenth embodiment (FIG. 16) in that the first and second vaporizing devices 15 and 18 are integrally formed into one unit, which is the same to the unitary structure of the fourth embodiment (FIG. 6).

Fifteenth Embodiment

FIG. 18

Figure 18:
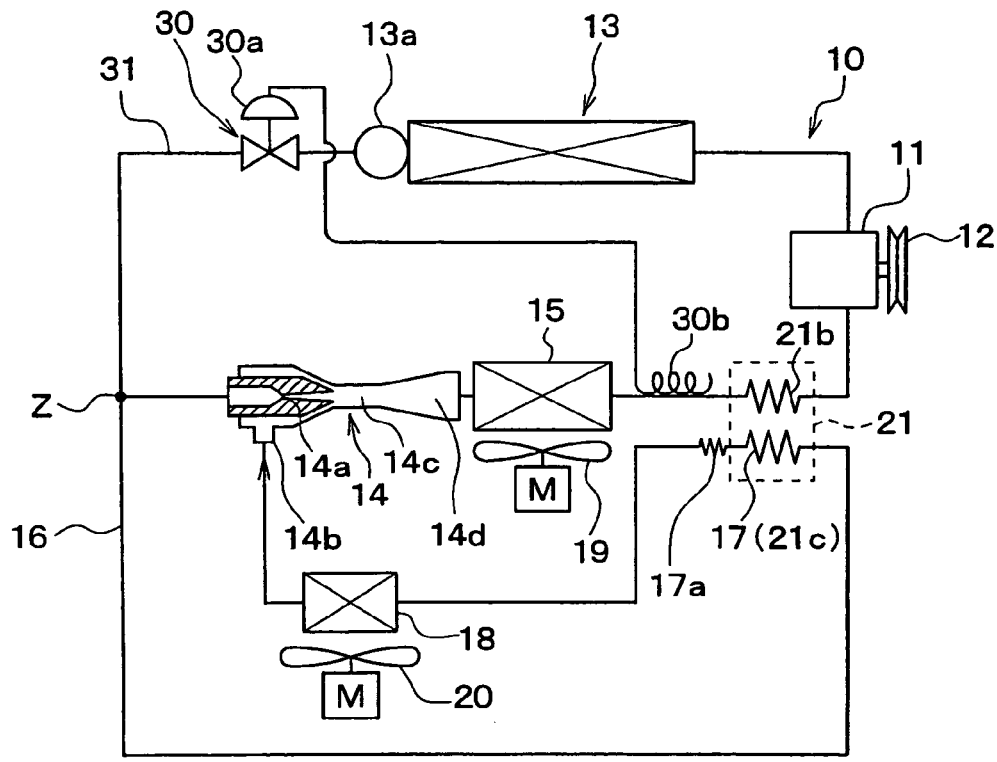

FIG. 18 shows a fifteenth embodiment, in which the restricting device in the bypass passage 16 is formed by a capillary tube 17, which is further constructed to operate as the internal heat exchanger 21 (the intermediate-pressure side refrigerant passage 21c).

Namely, the capillary tube 17 is formed as not only the restriction device in the bypass passage 16 but also a part (the refrigerant passage 21c) of the internal heat exchanger 21.

More specifically, the internal heat exchanger 21 of the double pipe structure is constructed such that the capillary tube 17 is formed as the inside pipe and a refrigerant passage from the first vaporizing device 15 (i.e. a refrigerant passage for the compressor inlet side) is formed as the outside pipe. The inside heat exchange 21 may be alternatively constructed such that the capillary tube 17 and the refrigerant passage from the first vaporizing device 15 (i.e. a refrigerant passage for the compressor inlet side) are connected with each other, so that the heat conduction between them can be performed in a good condition.

A part 17a of the capillary tube 17 having a predetermined length at a downstream side is arranged at an outside of the internal heat exchanger 21, so that heat exchange is not carried out at this part 17a and the part 17a operates only as the restricting device.

According to the fifteenth embodiment, the refrigerant of the intermediate-pressure from the expansion valve 30 is depressurized by the capillary tube 17 and at the same time the heat can be radiated to the low-pressure refrigerant in the inlet side of the compressor 11.

According to the eleventh embodiment of FIG. 14, the refrigerant of the intermediate-pressure from the expansion valve 30 is introduced to the restricting device 17 of the bypass passage 16, after the heat exchange has been carried out at the internal heat exchanger 21. Since the heat exchange amount for the internal heat exchange largely depends on an operating condition of the refrigerating cycle, the refrigerant flowing into the restricting device 17 varies from a condition of the super cooled liquid phase refrigerant to a condition of the gas-liquid refrigerant.

Since the refrigerant density largely varies from the super cooled liquid phase condition to the gas-liquid condition, it is difficult to perform an appropriate depressurizing characteristic for both cases of the super cooled liquid phase refrigerant and the gas-liquid refrigerant, by means of the restricting device, such as the capillary tube 17, which has a fixed restriction.

According to the fifteenth embodiment, however, the gas-liquid phase refrigerant of the intermediate-pressure from the expansion valve 30 is depressurized by the capillary tube 17 and at the same time the heat is radiated to the low-pressure refrigerant in the inlet side of the compressor 11.

Namely, while the condition of the gas-liquid phase refrigerant is maintained in the capillary tube 17, the depressurizing operation as well as the heat radiating operation can be carried out. Therefore, it is easier to design the refrigerating cycle, so that the depressurizing characteristic of the capillary tube 17 can be adjusted to an intended depressurizing characteristic (the intended depressurizing amount).

In the case that the whole length of the capillary tube 17 was constructed as the refrigerant passage of the internal heat exchanger 21, the refrigerant temperature would be decreased at a certain downstream portion of the capillary tube 17, to become lower than that of the low-pressure refrigerant in the compressor inlet side. In such a case, the heat could be reversely absorbed from the low-pressure refrigerant in the compressor inlet side.

According to the fifteenth embodiment, however, the part 17a of the capillary tube 17 having the predetermined length at the downstream side thereof is arranged at the outside of the internal heat exchanger 21, so that heat exchange is not carried out at this part 17a. As a result, the heat absorption at the downstream portion of the capillary tube 17 can be surely prevented.

Sixteenth Embodiment

FIG. 19

Figure 19:
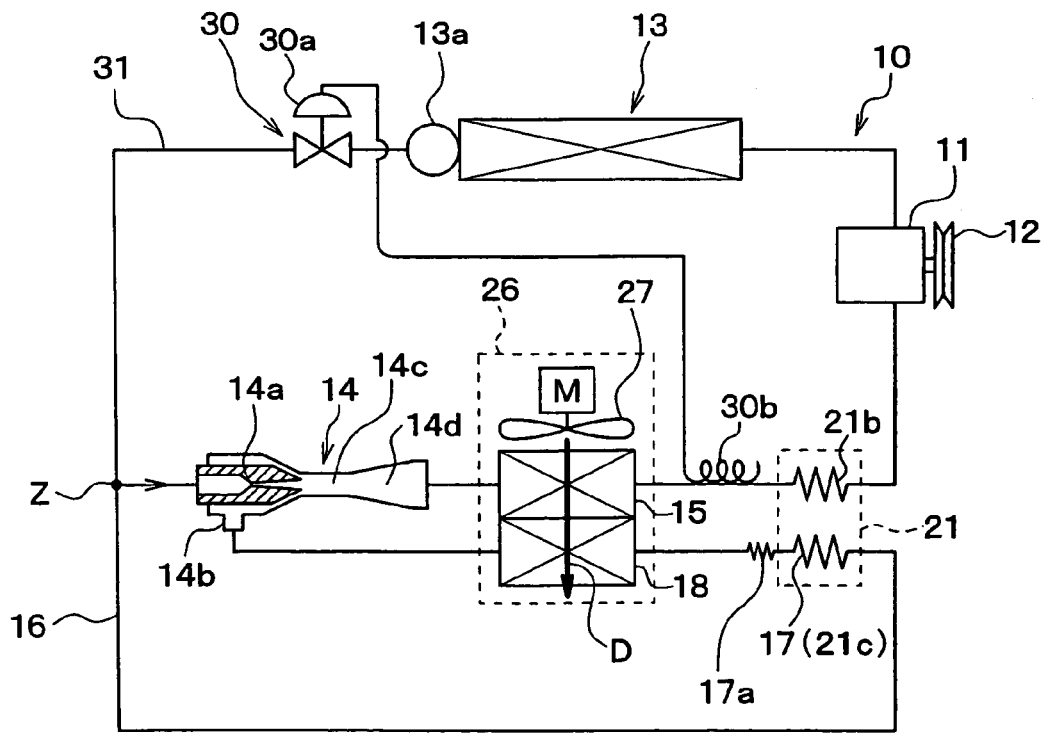

FIG. 19 shows a sixteenth embodiment, which differs from the above fifteenth embodiment (FIG. 18) in that the first and second vaporizing devices 15 and 18 are integrally formed into one unit, which is the same to the unitary structure of the fourth embodiment (FIG. 6).

Other Embodiments

The present invention should not be limited to the above explained embodiments, but various kinds of modifications are possible as below.

(1) In the above embodiments, electrically controlled valves, such as electromagnetic valves, may be provided in the refrigerant passage for the first vaporizing device 15, the first bypass passage 16 and the second bypass passage 22 for respectively controlling the passage areas thereof, so that the refrigerant flow to the first, second and/or third vaporizing devices 15, 18, 24 can be freely selected.

In such a modification, the electrically controlled valves may be used for the restricting devices 17, 23 in the first and second bypass passages 16, 22, so that those restricting devices can bring out not only the restricting operation but also an opening-closing operation of the refrigerant passages.

(2) In the refrigerating cycles shown in the first to fourth embodiments, in which the receiver 13a is provided at the outlet side of the heat radiating device 13 (called as a receiver cycle), a temperature dependent expansion valve may be arranged at the inlet side of the ejector 14 in order that the super heat degree of the refrigerant at the outlet side of the first vaporizing device 15 can be controlled by the expansion valve.

(3) In the above embodiments, the sub-critical cycle of the gas compression type is formed by the refrigerant, such as fluorocarbon gas, hydrocarbon gas and the like, high pressure of which does not exceed its critical pressure. The present invention can be also applied to a super critical cycle of the gas compression type, which is operated with the refrigerant, such as carbon dioxide ($CO_2$), high pressure of which exceeds its critical pressure.

In the super critical cycle, the heat of the refrigerant from the compressor is radiated at the heat radiating device 13 in the super critical condition, but the refrigerant is not condensed. The receiver 13a provided in refrigerant passage of the high-pressure can not separate the refrigerant into the gas phase and liquid phase refrigerants, and can not store the surplus liquid phase refrigerant.

In case of the super critical cycle, therefore, the accumulator may be provided at the outlet side of the first vaporizing device 15 for operating as the gas-liquid separator in the low-pressure side, as shown in FIG. 7 or 8.

In the above embodiments, the ejector 14 of a fixed type, in which the nozzle portion 14a has a fixed passage area, is used. An ejector of a variable type, in which the passage area at the nozzle portion can be adjusted, may be used.

As an example of the variable type ejector, it may be constructed such that a movable needle is inserted into a passage portion of the nozzle portion and a relative position of the needle with respect to the nozzle portion is varied by an electrical actuator, so that the passage area at the nozzle portion can be adjusted.

The refrigerant pressure at the high-pressure side can be controlled in the sub-critical and super critical cycles by adjusting the passage area of the nozzle portion of the variable type ejector.

(5) In the first embodiment and other embodiment, the present invention is applied to the refrigerating cycle, by which the air conditioning operation for the vehicle passenger room as well as the cooling operation for the vehicle refrigerating apparatus are performed. However, both of the first vaporizing device 15, the refrigerant evaporation temperature in which is on the high temperature side, and the second vaporizing device 18, the refrigerant evaporation temperature in which is on the low temperature side, can be used for the air conditioning operation for the vehicle passenger room, but for the different spaces (for example, the front seat space and the rear seat space).

(6) Furthermore, both of the first vaporizing device 15, the refrigerant evaporation temperature in which is on the high temperature side, and the second vaporizing device 18, the refrigerant evaporation temperature in which is on the low temperature side, can be used for the cooling operation for the vehicle refrigerating apparatus. Namely, the first vaporizing device 15, the refrigerant evaporation temperature in which is on the high temperature side, may be used for cooling a chill room, whereas the second vaporizing device 18, the refrigerant evaporation temperature in which is on the low temperature side, may be used for cooling a freezing compartment.

An electromagnetic valve may be combined with a fixed restriction to form the restricting devices 17, 23, so that a passage closing operation can be added to the operation for the flow amount control by the fixed restriction.

What is claimed is:

1. An ejector type refrigerating cycle comprising:

a compressor sucking refrigerant and compressing the same;

a heat radiating device radiating heat from high-pressure refrigerant pumped out from the compressor;

an ejector having a nozzle portion depressurizing and expanding the refrigerant from the heat radiating device, a suction port sucking the refrigerant by high speed refrigerant flow ejected from the nozzle portion, and a pressure increasing portion mixing the high speed refrigerant ejected from the ejector nozzle with the refrigerant sucked from the suction port and increasing fluid pressure of the refrigerant while converting the speed energy of the refrigerant to pressure energy;

a first vaporizing device evaporating the refrigerant from the ejector to perform a cooling operation;

a first bypass passage bifurcated at a bifurcating point which is located at an inlet side of the ejector supplying a part of the refrigerant from the heat radiating device to the suction port of the ejector so that the refrigerant from the heat radiating device is divided at the bifurcating point into two refrigerant flows which are simultaneously and respectively supplied to the nozzle portion of the ejector and to the first bypass passage;

a first restricting device provided in the first bypass passage depressurizing the part of the refrigerant from the heat radiating device;

a second vaporizing device provided in the first bypass passage at an outlet side of the first restricting device so that the first restricting device is provided between the bifurcating point and an inlet side of the second vaporizing device evaporating the refrigerant to perform a cooling operation; and an internal heat exchanger carrying out heat exchange between low-pressure refrigerant on an inlet side of the compressor and high-pressure refrigerant on an outlet side of the compressor; wherein the refrigerant from the compressor is supplied via the heat radiating device to a high-pressure side refrigerant passage of the internal heat exchanger, and the refrigerant from the first vaporizing device is exclusively supplied to a low-pressure side refrigerant passage of the internal heat exchanger.

2. An ejector type refrigerating cycle according to claim 1, wherein the high-pressure side refrigerant passage of the internal heat exchanger is arranged in the first bypass passage at an inlet side of the first restricting device.

3. An ejector type refrigerating cycle according to claim 1, further comprising:

a gas-liquid separator provided at an outlet side of the first vaporizing device separating the refrigerant into gas phase and liquid phase refrigerants, wherein the low-pressure side refrigerant passage of the internal heat exchanger is arranged at an outlet side of the gas-liquid separator.

4. An ejector type refrigerating cycle according to claim 1, wherein at least one of the high-pressure side and low-pressure side refrigerant passages comprises multiple passage portions, which are respectively arranged in different refrigerant passages of the refrigerating cycle.

5. An ejector type refrigerating cycle according to claim 1, wherein the internal heat exchanger is formed into a double pipe structure having an inside pipe formed in an inside of an outside pipe, the high-pressure side refrigerant passage is formed by one of the passage of the inside pipe and the passage formed between the inside and outside pipes, and the low-pressure side refrigerant passage is formed by the other of the passage of the inside pipe and the passage formed between the inside and outside pipes.

6. An ejector type refrigerating cycle comprising:

a compressor sucking refrigerant and compressing the same;

a heat radiating device radiating heat from high-pressure refrigerant pumped out from the compressor;

an ejector having a nozzle portion depressurizing and expanding the refrigerant from the heat radiating device, a suction port sucking the refrigerant by high speed refrigerant flow ejected from the nozzle portion, and a pressure increasing portion mixing the high speed refrigerant ejected from the ejector nozzle with the refrigerant sucked from the suction port and increasing fluid pressure of the refrigerant while converting the speed energy of the refrigerant to pressure energy;

a first vaporizing device evaporating the refrigerant from the ejector to perform a cooling operation;

a first bypass passage bifurcated at an inlet side of the ejector supplying a part of the refrigerant from the heat radiating device to the suction port of the ejector;

a first restricting device provided in the first bypass passage depressurizing the part of the refrigerant from the heat radiating device;

a second vaporizing device provided in the first bypass passage at an outlet side of the first restricting device evaporating the refrigerant to perform a cooling operation;

an internal heat exchanger carrying out heat exchange between low-pressure refrigerant on an inlet side of the compressor and high-pressure refrigerant on an outlet side of the compressor;

a second bypass passage bifurcated at the inlet side of the ejector supplying a part of the refrigerant from the heat radiating device to the inlet side of the compressor;

a second restricting device provided in the second bypass passage depressurizing the part of the refrigerant passing through the second bypass passage;

a third vaporizing device provided in the second bypass passage at an outlet side of the second restricting device evaporating the refrigerant to perform a cooling operation.

7. An ejector type refrigerating cycle according to claim 6, wherein a low-pressure side refrigerant passage of the internal heat exchanger is arranged in a refrigerant passage at a downstream side of a link-up point of an outlet side of the first vaporizing device and an outlet side of the third vaporizing device.

8. An ejector type refrigerating cycle according to claim 6, wherein the internal heat exchanger comprises at least first and second heat exchanging devices, a first high-pressure side refrigerant passage is formed in the first heat exchanging device, so that high-pressure refrigerant flowing in the first bypass passage passes through the first high-pressure side refrigerant passage, and a second high-pressure side refrigerant passage is formed in the second heat exchanging device, so that high-pressure refrigerant flowing in the second bypass passage passes through the second high-pressure side refrigerant passage.

9. An ejector type refrigerating cycle comprising:

a compressor sucking refrigerant and compressing the same;

a heat radiating device radiating heat from high-pressure refrigerant pumped out from the compressor;

an expansion valve provided in a refrigerant passage on an outlet side of the heat radiating device controlling condition of low-pressure refrigerant at the inlet side of the compressor by adjusting a passage opening area of the refrigerant passage;

an ejector having a nozzle portion depressurizing and expanding the refrigerant from the expansion valve, a suction port sucking the refrigerant by high speed refrigerant flow ejected from the nozzle portion, and a pressure increasing portion mixing the high speed refrigerant ejected from the ejector nozzle with the refrigerant sucked from the suction port and increasing fluid pressure of the refrigerant while converting the speed energy of the refrigerant to pressure energy;

a first vaporizing device evaporating the refrigerant from the ejector to perform a cooling operation;

a bypass passage bifurcated at a bifurcating point which is located at an inlet side of the ejector supplying a part of the refrigerant from the expansion valve to the suction port of the ejector so that the refrigerant from the expansion valve is divided at the bifurcating point into two refrigerant flows which are simultaneously and respectively supplied to the nozzle portion of the ejector and to the bypass passage;

a restricting device provided in the bypass passage depressurizing the part of the refrigerant from the expansion valve;

a second vaporizing device provided in the bypass passage at an outlet side of the restricting device so that the restricting device is provided between the bifurcating point and an inlet side of the second vaporizing device evaporating the refrigerant to perform a cooling operation; and an internal heat exchanger carrying out heat exchange between low-pressure refrigerant on the inlet side of the compressor and high-pressure refrigerant on an inlet side of the expansion valve, or between the low-pressure refrigerant on the inlet side of the compressor and intermediate-pressure refrigerant on an outlet side of the expansion valve, the refrigerant from the compressor is supplied, via the heat radiating device or the heat radiating device and the expansion valve, to a high-pressure side refrigerant passage or to an intermediate-pressure refrigerant passage of the internal heat exchanger, and the refrigerant from the first vaporizing device is exclusively supplied to a low-pressure side refrigerant passage of the internal heat exchanger.

10. An ejector type refrigerating cycle according to claim 9, wherein
the internal heat exchanger carries out the heat exchange between a high-pressure side refrigerant passage provided at the inlet side of the expansion valve and the low-pressure side refrigerant passage provided at the inlet side of the compressor.

11. An ejector type refrigerating cycle according to claim 9, wherein
the internal heat exchanger carries out the heat exchange between an intermediate-pressure side refrigerant passage provided in the bypass passage at the inlet side of the restricting device and the low-pressure side refrigerant passage provided at the inlet side of the compressor.

12. An ejector type refrigerating cycle according to claim 9, wherein
the internal heat exchanger carries out the heat exchange between an intermediate-pressure side refrigerant passage provided between the outlet side of the expansion valve and a bifurcating point of the bypass passage and the low-pressure side refrigerant passage provided at the inlet side of the compressor.

13. An ejector type refrigerating cycle according to claim 9, wherein
the restricting device is formed by a capillary tube, and the heat exchange of the internal heat exchanger is carried out between the capillary tube and the low-pressure side refrigerant passage on the inlet side of the compressor.

14. An ejector type refrigerating cycle according to claim 9, wherein
the expansion valve controls the condition of the low-pressure refrigerant between the outlet side of the first vaporizing device and the low-pressure side refrigerant passage in accordance with temperature and pressure of such refrigerant.

15. An ejector type refrigerating cycle comprising:
a compressor sucking refrigerant and compressing the same;
a heat radiating device radiating heat from high-pressure refrigerant pumped out from the compressor;
an ejector having a nozzle portion depressurizing and expanding the refrigerant from the heat radiating device, a suction port sucking the refrigerant by high speed refrigerant flow ejected from the nozzle portion, and a pressure increasing portion mixing the high speed refrigerant ejected from the ejector nozzle with the refrigerant sucked from the suction port and increasing fluid pressure of the refrigerant while converting the speed energy of the refrigerant to pressure energy;
a first vaporizing device evaporating the refrigerant from the ejector to perform a cooling operation;
a first bypass passage bifurcated at an inlet side of the ejector supplying a part of the refrigerant from the heat radiating device to the suction port of the ejector;
a first restricting device provided in the first bypass passage depressurizing the part of the refrigerant from the heat radiating device;
a second vaporizing device provided in the first bypass passage at an outlet side of the first restricting device evaporating the refrigerant to perform a cooling operation;
an internal heat exchanger carrying out heat exchange between low-pressure refrigerant on an inlet side of the compressor and high-pressure refrigerant on an outlet side of the compressor; wherein
the first and second vaporizing devices are integrally formed into one unit.

16. An ejector type refrigerating cycle comprising:
a first refrigerating circuit including;
a compressor compressing gas phase refrigerant and pumping out compressed high-pressure refrigerant;
a heat radiating device connected to an outlet side of the compressor cooling down the high-pressure refrigerant;
an ejector having an inlet port, an outlet port and a suction port, in which the inlet port of the ejector is connected to an outlet side of the heat radiating device, the ejector further having a nozzle portion depressurizing and expanding the refrigerant from the heat radiating device, wherein the outlet port mixes the high speed refrigerant ejected from the nozzle portion with the refrigerant sucked from the suction port and increases fluid pressure of the refrigerant while converting the speed energy of the refrigerant to the pressure energy; and
a first vaporizing device connected at its inlet side to the outlet port of the ejector, and at its outlet side to the inlet side of the compressor;
a second refrigerating circuit including;
the compressor;
the heat radiating device;
a bypass passage bifurcated from a bifurcating point which is located at an inlet side of the ejector and connected to the suction port of the ejector so that the refrigerant from the heat radiating device is divided at the bifurcating point into two refrigerant flows which are simultaneously and respectively supplied to the nozzle portion of the ejector and to the bypass passage;
a restricting device provided in the bypass passage depressurizing the refrigerant from the heat radiating device;
a second vaporizing device provided in the bypass passage so that the restricting device is provided between the bifurcating point and an inlet side of the second vaporizing device; and
the first vaporizing device; and an internal heat exchanger having high-pressure side and low-pressure side refrigerant passages, wherein the high-pressure side refrigerant passage is provided between the outlet side of the heat radiating device and the inlet port of the ejector, and/or between the outlet side of the heat radiating device and the inlet side of the second vaporizing device, whereas the low-pressure side refrigerant passage is provided between the outlet side of the first vaporizing device and the inlet side of the compressor; wherein the refrigerant from the compressor is supplied, via the heat radiating device to the high-pressure side refrigerant passage of the internal heat exchanger, and the refrigerant from the first vaporizing device is exclusively supplied to the low-pressure side refrigerant passage of the internal heat exchanger.

17. An ejector type refrigerating cycle according to claim 16, further comprising:
a gas-liquid separator provided at the outlet side of the heat radiating device.

18. An ejector type refrigerating cycle according to claim 16, further comprising:
a restricting device provided in the bypass passage at the inlet side of the second vaporizing device.

19. An ejector type refrigerating cycle according to claim 16, further comprising:
an accumulator provided between the outlet side of the first vaporizing device and the low-pressure side refrigerant passage of the internal heat exchanger.

20. An ejector type refrigerating cycle according to claim 16, wherein
the heat radiating device comprises first and second heat radiating portions,
the high-pressure side refrigerant passage of the internal heat exchanger comprises first and second refrigerant passage portions,
the first refrigerating circuit is formed by the compressor, the first heat radiating portion, the first refrigerant passage portion of the internal heat exchanger, the second heat radiating portion, the inlet and outlet ports of the ejector, the first vaporizing device, an accumulator, and the low-pressure side refrigerant passage of the internal heat exchanger, and
the second refrigerating circuit is formed by the compressor, the first heat radiating portion, the first refrigerant passage portion of the internal heat exchanger, the second heat radiating portion, the second refrigerant passage portion, a restricting device, the second vaporizing device, the suction and outlet ports of the ejector, the first vaporizing device, the accumulator, and the low-pressure side refrigerant passage of the internal heat exchanger.

21. An ejector type refrigerating cycle according to claim 16, further comprising:
an expansion device provided between the outlet side of the high-pressure side refrigerant passage of the internal heat exchanger and the inlet port of the ejector, and between the outlet side of the high-pressure side refrigerant passage of the internal heat exchanger and the inlet side of the second vaporizing device.

22. An ejector type refrigerating cycle according to claim 16, wherein the first and second vaporizing devices are integrally formed into one unit.

23. An ejector type refrigerating cycle comprising:
a first refrigerating circuit including;
a compressor compressing gas phase refrigerant and pumping out compressed high-pressure refrigerant;
a heat radiating device connected to an outlet side of the compressor cooling down the high-pressure refrigerant;
an ejector having an inlet port, an outlet port and a suction port, in which the inlet port of the ejector is connected to an outlet side of the heat radiating device, the ejector further having a nozzle portion depressurizing and expanding the refrigerant from the heat radiating device, wherein the outlet port mixes the high speed refrigerant ejected from the nozzle portion with the refrigerant sucked from the suction port and increases fluid pressure of the refrigerant while converting the speed energy of the refrigerant to the pressure energy; and
a first vaporizing device connected at its inlet side to the outlet port of the ejector, and at its outlet side to the inlet side of the compressor;
a second refrigerating circuit including;
the compressor;
the heat radiating device;
a bypass passage bifurcated from the inlet side of the ejector and connected to the suction port of the ejector;
a second vaporizing device provided in the bypass passage; and
the first vaporizing device;
an internal heat exchanger having high-pressure side and low-pressure side refrigerant passages, wherein the high-pressure side refrigerant passage is provided between the outlet side of the heat radiating device and the inlet port of the ejector, and/or between the outlet side of the heat radiating device and the inlet side of the second vaporizing device, whereas the low-pressure side refrigerant passage is provided between the outlet side of the first vaporizing device and the inlet side of the compressor;
a third refrigerating circuit including;
the compressor;
the heat radiating device;
a second bypass passage bifurcated from the inlet side of the ejector and connected to the outlet side of the first vaporizing device; and
a third vaporizing device provided in the second bypass passage.

24. An ejector type refrigerating cycle according to claim 23, further comprising:
a restricting device provided in the second bypass passage at the inlet side of the third vaporizing device.

25. An ejector type refrigerating cycle comprising:
a first refrigerating circuit including;
a compressor compressing gas phase refrigerant and pumping out compressed high-pressure refrigerant;
a heat radiating device connected to an outlet side of the compressor cooling down the high-pressure refrigerant;
an ejector having an inlet port, an outlet port and a suction port, in which the inlet port of the ejector is connected to an outlet side of the heat radiating device, the ejector further having a nozzle portion depressurizing and expanding the refrigerant from the heat radiating device, wherein the outlet port mixes the high speed refrigerant ejected from the nozzle portion with the refrigerant sucked from the suction port and increases fluid pressure of the refrigerant while converting the speed energy of the refrigerant to the pressure energy; and a first vaporizing device connected at its inlet side to the outlet port of the ejector, and at its outlet side to the inlet side of the compressor;
a second refrigerating circuit including;
the compressor;
the heat radiating device;
a bypass passage bifurcated from the inlet side of the ejector and connected to the suction port of the ejector;
a second vaporizing device provided in the bypass passage; and
the first vaporizing device;
an internal heat exchanger having high-pressure side and low-pressure side refrigerant passages, wherein the high-pressure side refrigerant passage is provided between the outlet side of the heat radiating device and the inlet port of the ejector, and/or between the outlet side of the heat radiating device and the inlet side of the second vaporizing device, whereas the low-pressure side refrigerant passage is provided between the outlet side of the first vaporizing device and the inlet side of the compressor; wherein
the internal heat exchanger comprises first and second heat exchanging portions,
the first refrigerating circuit is formed by the compressor, the heat radiating device, the inlet and outlet ports of the ejector, the first vaporizing device, an accumulator, and the low-pressure side refrigerant passage of the first heat exchanging portion,
the second refrigerating circuit is formed by the compressor, the heat radiating device, the high-pressure side refrigerant passage of the first heat exchanging portion, a restricting device, the second vaporizing device, the suction and outlet ports of the ejector, the first vaporizing device, the accumulator, and the low-pressure side refrigerant passage of the first heat exchanging portion, and
a third refrigerating circuit is formed by the compressor, the heat radiating device, the high-pressure side refrigerant passage of the second heat exchanging portion, a restricting device, a third vaporizing device and the low-pressure side refrigerant passage of the second heat exchanging portion.

26. An ejector type refrigerating cycle comprising:
a first refrigerating circuit including;
a compressor compressing gas phase refrigerant and pumping out compressed high-pressure refrigerant;
a heat radiating device connected to an outlet side of the compressor cooling down the high-pressure refrigerant;
an expansion valve arranged at the outlet side of the heat radiating device depressurizing the refrigerant from the heat radiating device;
an ejector having an inlet port, an outlet port and a suction port, in which the inlet port of the ejector is connected to an outlet side of the expansion valve, the ejector further having a nozzle portion depressurizing and expanding the refrigerant from the expansion valve, wherein the outlet port mixes the high speed refrigerant ejected from the nozzle portion with the refrigerant sucked from the suction port and increases fluid pressure of the refrigerant while converting the speed energy of the refrigerant to the pressure energy; and
a first vaporizing device connected at its inlet side to the outlet port of the ejector, and at its outlet side to the inlet side of the compressor;
a second refrigerating circuit including;
the compressor;
the heat radiating device;
the expansion valve;
a bypass passage bifurcated from a bifurcating point which is located at an inlet side of the ejector and connected to the suction port of the ejector so that the refrigerant from the expansion valve is divided at the bifurcating point into two refrigerant flows which are simultaneously and respectively supplied to the nozzle portion of the ejector and to the bypass passage;
a restricting device provided in the bypass passage for depressurizing the refrigerant from expansion valve;
a second vaporizing device provided in the bypass passage so that the restricting device is provided between the bifurcating point and an inlet side of the second vaporizing device; and
the first vaporizing device; and
an internal heat exchanger having intermediate-pressure side and low-pressure side refrigerant passages, wherein the intermediate-pressure side refrigerant passage is provided between the outlet side of the expansion valve and the inlet side of the second vaporizing device, whereas the low-pressure side refrigerant passage is provided between the outlet side of the first vaporizing device and the inlet side of the compressor; wherein
the refrigerant from the compressor is supplied via the heat radiating device and the expansion valve to the intermediate-pressure side refrigerant passage of the internal heat exchanger, and
the refrigerant from the first vaporizing device is exclusively supplied to the low-pressure side refrigerant passage of the internal heat exchanger.

27. An ejector type refrigerating cycle comprising:
a first refrigerating circuit including;
a compressor compressing gas phase refrigerant and pumping out compressed high-pressure refrigerant;
a heat radiating device connected to an outlet side of the compressor cooling down the high-pressure refrigerant
an expansion valve arranged at the outlet side of the heat radiating device depressurizing the refrigerant from the heat radiating device;
an ejector having an inlet port, an outlet port and a suction port, in which the inlet port of the ejector is connected to an outlet side of the expansion valve, the ejector further having a nozzle portion depressurizing and expanding the refrigerant from the expansion valve, wherein the outlet port mixes the high speed refrigerant ejected from the nozzle portion with the refrigerant sucked from the suction port and increases fluid pressure of the refrigerant while converting the speed energy of the refrigerant to the pressure energy; and
a first vaporizing device connected at its inlet side to the outlet port of the ejector, and at its outlet side to the inlet side of the compressor;
a second refrigerating circuit including;
the compressor;
the heat radiating device;
the expansion valve;
a bypass passage bifurcated from a bifurcating point which is located at an inlet side of the ejector and connected to the suction port of the ejector so that the refrigerant from the expansion valve is divided at the bifurcating point into two refrigerant flows which are simultaneously and respectively supplied to the nozzle portion of the ejector and to the bypass passage;

a restricting device provided in the bypass passage for depressurizing the refrigerant from the expansion valve;

a second vaporizing device provided in the bypass passage; and the first vaporizing device; and an internal heat exchanger having intermediate-pressure side and low-pressure side refrigerant passages, wherein the intermediate-pressure side refrigerant passage is provided between the outlet side of the expansion valve and the bifurcating point, whereas the low-pressure side refrigerant passage is provided between the outlet side of the first vaporizing device and the inlet side of the compressor; wherein the refrigerant from the compressor is supplied, via the heat radiating device and the expansion valve to the intermediate-pressure side refrigerant passage of the internal heat exchanger, and the refrigerant from the first vaporizing device is exclusively supplied to the low-pressure side refrigerant passage of the internal heat exchanger.

28. An ejector type refrigerating cycle comprising:

a first refrigerating circuit including;

a compressor compressing gas phase refrigerant and pumping out compressed high-pressure refrigerant;

a heat radiating device connected to an outlet side of the compressor cooling down the high-pressure refrigerant;

an expansion valve arranged at the outlet side of the heat radiating device depressurizing the refrigerant from the heat radiating device;

an ejector having an inlet port, an outlet port and a suction port, in which the inlet port of the ejector is connected to an outlet side of the expansion valve, the ejector further having a nozzle portion depressurizing and expanding the refrigerant from the expansion valve, wherein the outlet port mixes the high speed refrigerant ejected from the nozzle portion with the refrigerant sucked from the suction port and increases fluid pressure of the refrigerant while converting the speed energy of the refrigerant to the pressure energy; and a first vaporizing device connected at its inlet side to the outlet port of the ejector, and at its outlet side to the inlet side of the compressor;

a second refrigerating circuit including;

the compressor;

the heat radiating device;

the expansion valve;

a bypass passage bifurcated from a bifurcated point which is located at an inlet side of the ejector and connected to the suction port of the ejector so that the refrigerant from the expansion valve is divided at the bifurcating point into two refrigerant flows which are simultaneously and respectively supplied to the nozzle portion of the ejector and to the bypass passage;

a restricting device provided in the bypass passage for depressurizing the refrigerant from the expansion valve;

a second vaporizing device provided in the bypass passage; and the first vaporizing device; and an internal heat exchanger having intermediate-pressure side and low-pressure side refrigerant passages, wherein the intermediate-pressure side refrigerant passage is provided between the inlet side of the ejector and the inlet side of the second vaporizing device, whereas the low-pressure side refrigerant passage is provided between the outlet side of the first vaporizing device and the inlet side of the compressor; wherein the refrigerant from the compressor is supplied, via the heat radiating device and the expansion valve to the intermediate-pressure side refrigerant passage of the internal heat exchanger;

the refrigerant from the first vaporizing device is exclusively supplied to the low-pressure side refrigerant passage of the internal heat exchanger;

a capillary tube is provided in the bypass passage, an upstream portion of which forms the intermediate-pressure side refrigerant passage of the internal heat exchanger, and a downstream portion of the capillary tube is formed at an outside of the internal heat exchanger, so that the refrigerant in the downstream portion is not heat exchanged with the refrigerant in the low-pressure side refrigerant passage of the internal heat exchanger.

* * * * *